US008489209B2

(12) United States Patent
Starr et al.

(10) Patent No.: US 8,489,209 B2
(45) Date of Patent: Jul. 16, 2013

(54) METHOD FOR ANALYZING AND DIAGNOSING LARGE SCALE PROCESS AUTOMATION CONTROL SYSTEMS

(75) Inventors: Kevin Dale Starr, Lancaster, OH (US); Timothy Andrew Mast, Plain City, OH (US); Robert Trent Garverick, Columbus, OH (US)

(73) Assignee: ABB Inc., Cary, NC (US)

( * ) Notice: Subject to any disclaimer, the term of this patent is extended or adjusted under 35 U.S.C. 154(b) by 0 days.

(21) Appl. No.: 13/357,413

(22) Filed: Jan. 24, 2012

(65) Prior Publication Data
US 2013/0030555 A1   Jan. 31, 2013

Related U.S. Application Data

(60) Provisional application No. 61/435,482, filed on Jan. 24, 2011.

(51) Int. Cl.
| | |
|---|---|
| G05B 11/01 | (2006.01) |
| G05B 13/02 | (2006.01) |
| G06F 17/18 | (2006.01) |
| G06F 19/00 | (2006.01) |
| G06F 11/30 | (2006.01) |
| G21C 17/00 | (2006.01) |
| H03F 1/26 | (2006.01) |
| H04B 15/00 | (2006.01) |

(52) U.S. Cl.
USPC .......... 700/52; 700/17; 700/26; 700/28; 700/32; 702/179; 702/183; 702/189

(58) Field of Classification Search
USPC .......... 700/17, 26, 28, 32, 52; 702/179, 702/183, 189
See application file for complete search history.

(56) References Cited

U.S. PATENT DOCUMENTS

| | | | |
|---|---|---|---|
| 4,001,807 | A | 1/1977 | Dallimonti |
| 4,303,973 | A | 12/1981 | Williamson, Jr. et al. |
| 4,885,676 | A | 12/1989 | Zweighaft |
| 5,329,465 | A | 7/1994 | Arcella et al. |

(Continued)

FOREIGN PATENT DOCUMENTS

| | | |
|---|---|---|
| GB | 2379749 A | 3/2003 |
| JP | 60093518 | 5/1985 |
| WO | 2012103125 A1 | 8/2012 |

OTHER PUBLICATIONS

N.F.Thornhill,M.Oettinger and P.Fedenczuk, "Performance Assessment and Diagnosis of Refinery Control Loops," AIChE Symposium Series No. 320, 94, 373-379, Presented at Foundations of Computer Aided Process Operations conference, Snowbird, Utah, Jul. 5-9, 1998.

*Primary Examiner* — Ronald Hartman, Jr.
(74) *Attorney, Agent, or Firm* — Paul R. Katterle

(57) ABSTRACT

A method is provided for analyzing and diagnosing a large scale process automation control system having a plurality of control loops. Assessments for pre-defined key performance indicators (KPIs) are automatically generated for control, process and signal sections of each control loop. The automatically generated assessments of the pre-defined KPIs may be displayed in a graphical user interface (GUI) of a computer. A user may change the automatically generated assessments of the pre-defined KPIs. Different data views may also be displayed in the GUI. The data views include time series trends for measured process variable, controller output, controller set point and error, as well as controller parameter clustering views in two-dimensional and three-dimensional plots.

15 Claims, 26 Drawing Sheets

U.S. PATENT DOCUMENTS

| | | | | |
|---|---|---|---|---|
| 5,631,825 | A | 5/1997 | Van Weele et al. | |
| 5,644,487 | A | 7/1997 | Duff et al. | |
| 5,719,788 | A | 2/1998 | Seborg et al. | |
| 5,796,606 | A | 8/1998 | Spring | |
| 5,838,561 | A * | 11/1998 | Owen | 700/32 |
| 6,298,454 | B1 * | 10/2001 | Schleiss et al. | 714/37 |
| 6,466,893 | B1 * | 10/2002 | Latwesen et al. | 702/179 |
| 6,557,118 | B2 * | 4/2003 | Schleiss et al. | 714/37 |
| 6,615,090 | B1 * | 9/2003 | Blevins et al. | 700/26 |
| 6,666,049 | B1 | 12/2003 | Katende et al. | |
| 6,804,618 | B2 * | 10/2004 | Junk | 702/77 |
| 6,847,850 | B2 * | 1/2005 | Grumelart | 700/37 |
| 6,865,511 | B2 | 3/2005 | Frerichs et al. | |
| 7,010,376 | B2 * | 3/2006 | Ettaleb et al. | 700/111 |
| 7,023,440 | B1 | 4/2006 | Havekost et al. | |
| 7,389,204 | B2 | 6/2008 | Eryurek et al. | |
| 7,877,232 | B2 | 1/2011 | Lee et al. | |
| 7,996,096 | B2 * | 8/2011 | Latwesen | 700/52 |
| 2002/0010562 | A1 * | 1/2002 | Schleiss et al. | 702/183 |
| 2002/0040284 | A1 * | 4/2002 | Junk | 702/189 |
| 2003/0014130 | A1 * | 1/2003 | Grumelart | 700/28 |

* cited by examiner

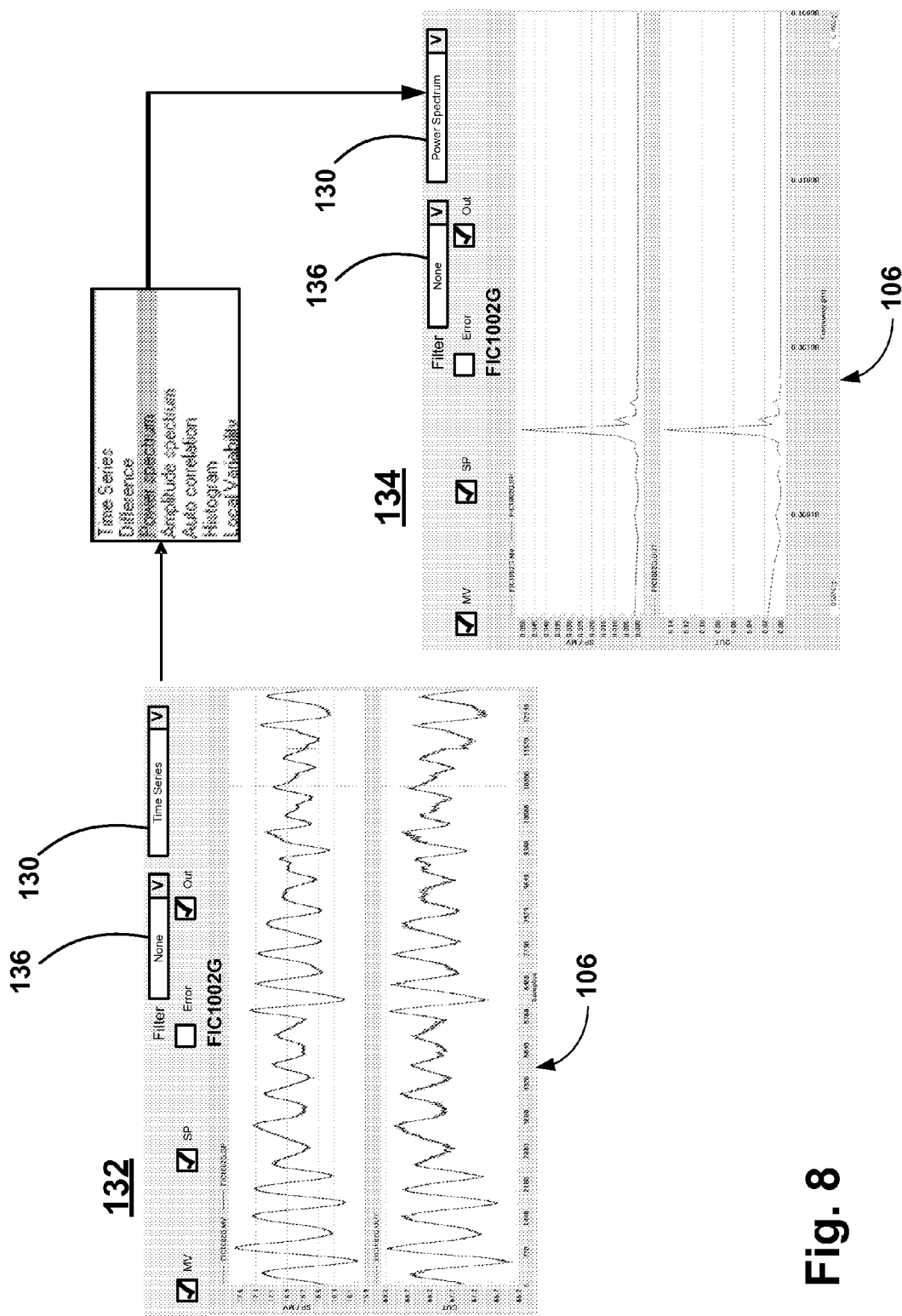

| | Controller Name | LPM:01 mean_CE | LPM:02 stdev_CE_norm | LPM:03 stdev_CE_EngU | LPM:04 mean_PV |
|---|---|---|---|---|---|
| ▶ | AI1402 | 0.646 | 0.682 | 136 | 3370 |
| | AIC1403A | 0.033 | 0.0331 | 0.199 | 8.2 |
| | AIC1403B | -1.01E-05 | 7.99E-05 | 0.016 | 8.2 |
| | FC111 | -27.5 | 27.5 | 55 | 55 |
| | FC112 | -9.6 | 9.6 | 96 | 100 |
| | FC113 | 0 | 0 | 0 | 0 |
| | FC114 | -15 | 15 | 15 | 15 |
| | FFIC81220 | -67.1 | 67.1 | 67.1 | 68 |
| | FIC1001G | -10.1 | 10.1 | 10.1 | 17.1 |
| | FIC1002G | 8.08E-05 | 0.0171 | 0.0171 | 16.8 |
| | FIC1180BA | 0 | 0 | 0 | 0 |
| | FIC1180BB | 0 | 0 | 0 | 0 |
| | FIC1201 | 0 | 0 | 0 | 0.39 |
| | FIC1202 | 6.87E-06 | 7.49E-06 | 0.00899 | -0.00498 |
| | FIC1203 | 0.012 | 0.0121 | 0.0302 | -0.03 |

Tabs: MV | SP | Out | ERR | LPM | All

152

Controller Properties

Controller | Analysis

| Name | TypedName | Value |
|---|---|---|
| Controller | | 11AJ182 |
| Priority | | Medium |
| Category | | Analyzer |
| | | |
| Properties | | |
| Loop Description | Loop Description | Protectorsystem 2 Stufe 2 Akzept |
| Process Area | Process Area | Stoffaufbereitung |
| Priority | Priority | 1 |
| Customer Comment | Other | |
| MV | Other | 1.596 |
| MV High Limit | MV High Limit | 4 |
| MV Low Limit | MV Low Limit | 0 |
| Meas Units | Meas Units | bar |
| Loop Category | Loop Category | Pressure |
| SP | Other | 1.6 |
| SP High Limit | SP High Limit | 4 |
| SP Low Limit | SP Low Limit | 0 |
| OUT | Other | 43.05 |
| OUT High Limit | OUT High Limit | 100 |
| OUT Low Limit | OUT Low Limit | 0 |
| AUTO | Other | True |
| Proportional | Proportional | 0.7 |
| Integral | Integral | 100 |
| Derivative | Derivative | 0 |

METHOD FOR ANALYZING AND DIAGNOSING LARGE SCALE PROCESS AUTOMATION CONTROL SYSTEMS

CROSS-REFERENCE TO RELATED APPLICATION

This application claims the benefit of U.S. provisional patent application No. 61/435,482 filed on Jan. 24, 2011, which is hereby incorporated by reference in its entirety.

BACKGROUND OF THE INVENTION

This invention relates to industrial controllers and more particularly to evaluating the performance of industrial controllers.

Industrial process controllers (hereinafter, simply "controllers") have many different configurations and are used in many different applications. Controllers may be mounted in a control room or may be part of a distributed control system. Controllers are designed to maintain a process variable at a desired reference point known as a set point. Process variables can be flow, pressure, temperature, consistency, speed, current, level, pH, etc. A conventional example of how a controller may be physically connected in an industrial process is shown in the functional block diagram of FIG. 1. In this example, a controller has an output that is converted into pressure to move a final control element, which in this example is a control valve. Movement of the control valve causes a change in the flow of material through a pipe. An instrument (such as transmitter with a sensor) measures a simple differential pressure in the pipe and transmits a current signal representative of the measurement back to the controller. This arrangement is a control loop in one of its simplest forms.

A control loop, such as the one described above can experience a problem that results in poor control of the process variable. The problem can be with the final control element, the sensor, tuning parameters of the controller, or something else. If the control loop is isolated or is only one of a handful of control loops, an experienced control engineer can usually analyze the control loop and determine what the problem is within a reasonable period of time. In a large industrial facility, however, it is not uncommon to have hundreds of control loops with hundreds of controllers. In such an industrial facility, it is difficult, to say the least, to determine which control loops are experiencing problems, especially when a problem in one control loop may adversely affect other control loops.

Based on the foregoing, there is a need in the art for a method for helping a control engineer to monitor a plurality of control loops and to identify and diagnose any of those control loops that are experiencing problems. The present invention is directed toward such a method.

SUMMARY OF THE INVENTION

In accordance with the invention, a method is provided for analyzing one or more of a plurality of control loops of a control system operable to control a process. The control loops each have a controller, a final control element and a measurement device for providing the controller with a measurement of a process variable being controlled by the controller. In accordance with the method, a selection of one of the control loops for analysis is received from a user. An assessment is generated for a pre-defined key performance indicator (KPI) for each of first, second and third sections of the selected control loop. The first section relates to the controller of the selected control loop, the second section relates to the process and the final control element of the selected control loop and the third section relates to the measurement of the process variable of the selected control loop. At least two different types of control data of the selected control loop are displayed, in a single screen of a graphical user interface (GUI) of the computer. The types of control data are selected from the group consisting of the measurement of the process variable, output of the controller, set point of the controller, proportional tuning parameter of the controller, integral tuning parameter of the controller and error, which is the difference between the set point of the controller and the measurement of the process variable. The generated assessments of the pre-defined KPIs for the selected control loop are displayed in the single screen of the GUI of the computer. A different assessment for one of the KPIs for the selected control loop is received from a user. The received different assessment of the one of the pre-defined KPIs for the selected control loop is displayed in the single screen of the GUI of the computer in lieu of the generated assessment for the one of the pre-defined KPIs for the selected control loop.

BRIEF DESCRIPTION OF THE DRAWINGS

The features, aspects, and advantages of the present invention will become better understood with regard to the following description, appended claims, and accompanying drawings where:

FIG. 8 shows a portion of a display in the GUI having a controller data grouping view for a controller and showing time series trends;

FIG. 9 shows a portion of a display in the GUI having a controller data grouping view for the controller of FIG. 8 and showing power spectrum trends;

FIG. 10 shows a portion of a display in the GUI having a numerical methods table view;

FIG. 12 shows a portion of a display in the GUI having a controller property view;

FIG. 28 shows a portion of a display in the GUI having a third level KPI grouping;

FIG. 29 shows a printed report for controllers that have issues in major KPIs in the control area;

FIG. 30 shows a printed report for controllers that have issues in major KPIs in the process area; and FIG. 31 shows a printed report for controllers that have issues in major KPIs in the signal conditioning area.

DETAILED DESCRIPTION OF ILLUSTRATIVE EMBODIMENTS

Figure 1:
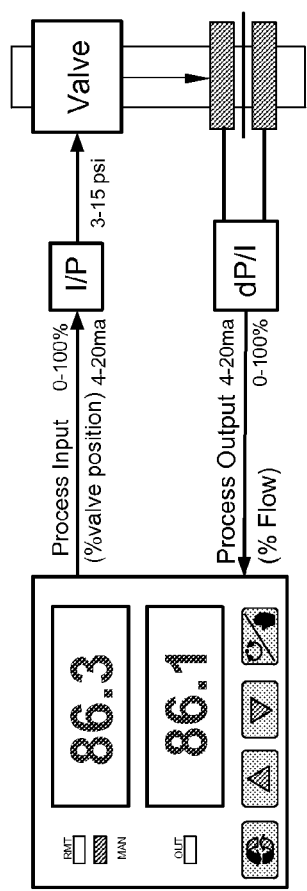
FIG. 1 is a schematic representation of a conventional control loop.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
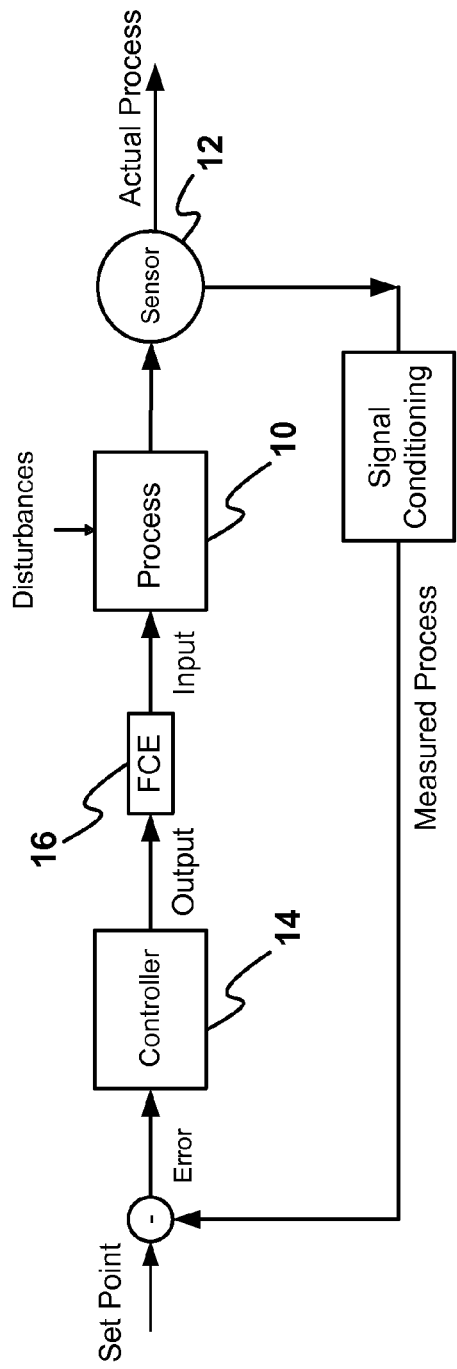
FIG. 2 is a block diagram of a control loop.

While the area of process control is quite vast, with many different control loops being utilized, nearly all industrial single loop control applications can be represented with a block diagram, such as is shown in FIG. 2. In this diagram, the process 10 is any industrial process having a variable that can be measured by a sensor 12, which is in direct or indirect contact with the process 10. The sensor 12 is a transducer that converts a physical property (variable) of the process 10 into a signal that can be transmitted. This signal (which represents the value of the process variable) is referred to as a measured value (MV) and is transmitted to a controller 14 by a transmitter. A set point (SP) is a desired value of the MV and is used for regulation. The difference between the SP and the MV is referred to as the error (E). The goal of the controller 14 is typically to minimize E. An output of the controller 14 is transmitted to a final control element (FCE) 16, which is connected into the process 10 and is operable to affect the process 10 and, in particular, the variable.

The most common single control loop is a PID control loop. There are three common forms of a PID control loop: Standard, Parallel, and Classical. For ease of description and not limitation, only the Standard PID control loop will be discussed. The Laplace domain definition for the Standard PID algorithm used by a Standard PID control loop is as follows:

$$U = P\left(e + \frac{1}{I(s)} + D(s)\right)$$

Where:
P represents the proportional controller gain
I represents the integral time in seconds
D represents the derivative gain in seconds
e represents the error=SP−MV Different manufacturers of PID controllers have different definitions and names for the proportional, integral and derivative terms. "Gain" and "time" are examples of this. Since the proportional, integral and derivative terms are generically referred to as "tuning parameters", the terms proportional, integral and derivative tuning parameters will be used in the paragraphs that follow; it being understood that these terms are meant to include the proportional controller gain, the integral time and the derivative gain, as well as the other proportional, integral and derivative terms used by other manufacturers.

A control loop can be operated in an automatic mode or a manual mode. In a manual mode, the operator makes adjustments to the FCE. In automatic mode the controller makes adjustments to the FCE.

The goal of a control loop is usually to minimize the error. In so doing, regulation is performed by tracking of the measured variable to the reference set point by automatic controller adjustments of the FCE. The size of the automatic adjustments is determined by the settings associated with the parameters referred to as Proportional, Integral, and Derivative. The means of determining the Proportional, Integral, and Derivative parameters is often referred to as tuning.

A controller in a control loop may be a hardware device or may be software code implemented in a microprocessor-based device. In the latter case, the controller may be in the form of a function block. As is known, a function block is a packaged block of software code that includes one or more inputs and one or more outputs and is operable to perform one or more predetermined algorithms or functions. Function blocks are adapted to be interconnected to create a function block diagram, which is a software program operable to control one or more control loops of a process. Features of a function block include data preservation between executions, encapsulation, and information hiding. Every time a function block is called, a separate copy of the function block is made in memory, thereby permitting data to be preserved in the called function block. Encapsulation permits a collection of software code elements to be handled as one entity, and information hiding restricts external access to data and algorithms within the encapsulated elements. Encapsulation and information hiding prevent accidental modification of software code or overwriting of internal data when code is copied from a previous control solution.

A plurality of function block controllers (and associated control loops) may be implemented in a microprocessor-based device, which is, itself, often referred to as a controller. So as to avoid confusion, a microprocessor-based device running one or more software controllers will be referred to herein as a "control module". In addition, a function block controller will merely be referred to as a "controller".

Figure 3:
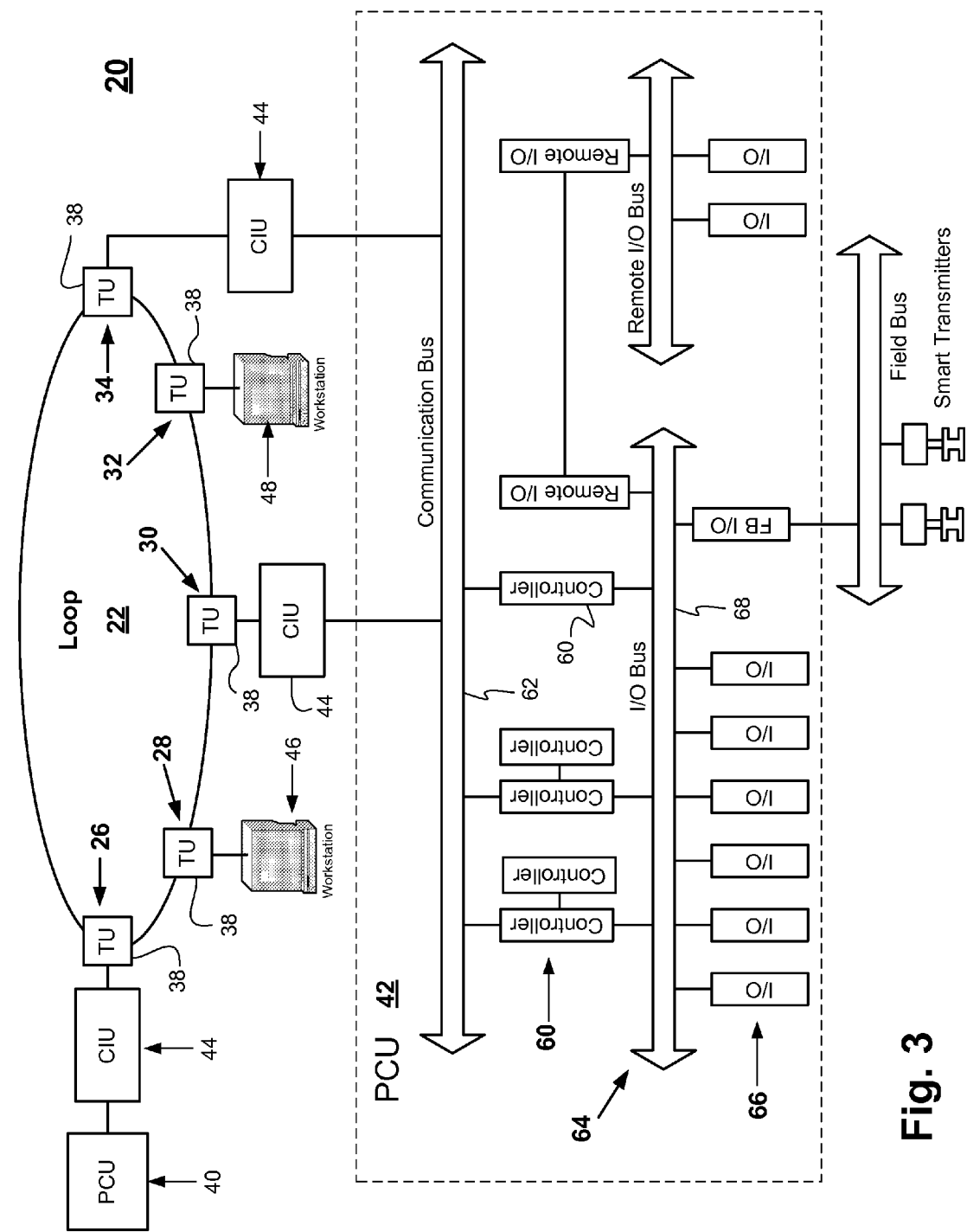
FIG. 3 is a schematic diagram of a process control system with which a monitoring system of the present invention may be utilized.

Referring now to FIG. 3, there is shown a schematic drawing of one example of a control system that the present invention may be used with. This example is DCS 20, which includes a loop or ring 22 comprising one or more network cables 24 to which a plurality of nodes 26, 28, 30, 32, 34 are connected. Each node includes an electronic device or plurality of electronic devices that is/are connected to the ring 22 for communication with other nodes on the ring 22. Each node has a unique address on the ring and is connected to the ring 22 by a termination unit (TU) 38. Although only one ring is shown in FIG. 3, it should be appreciated that the DCS 20 may include a plurality of rings. In one embodiment, the ring 22 is a unidirectional, high speed serial data network that operates at 10-megahertz or 2-megahertz communication rate.

The nodes 26, 30 comprise process control units (PCUs) 40, 42, respectively. As will be described in more detail below, each PCU 40, 42 comprises a network communication manager (NCM) module 45 and one or more control modules 60 for controlling a process or sub-process in an industrial facility, such as a power generation plant, a paper mill or a chemical or manufacturing plant. The NCM module 45 monitors the control modules for outgoing data to package and routes and delivers incoming data to the control modules. Each control module may be redundant, and a PCU may contain a redundant NCM module 45 attached to the network on a second TU 38. Each of the nodes 26, 30 is connected to the ring 22 through a TU 38 and one or more NCM modules 45.

The nodes 28, 32 comprise computer interface units (CIUs) 44 with operator workstations 46, 48 connected thereto, respectively. Each workstation 46, 48 comprises a processor and associated memory as well as a monitor for displaying a graphical user interface (GUI) through which operators may monitor and manually control the processes and sub-processes in the facility. Each workstation 46, 48 is connected to the ring 22 through a CIU 44 and a TU 38. The CIU 44 may be separate from or integrated into a workstation but is a part of the DCS 20. For ease of illustration, the CIUs 44 associated with the workstations 46, 48 are integrated with the workstations 46, 48. An interface system 54 runs on the processor of the workstation 48.

The PCU 42 comprises a plurality of control modules 60 connected to a communication bus 62, which may be a serial communication system with an Ethernet-like protocol. Each control module 60 contains one or more software controllers (e.g., function block controllers) for controlling one or more loops of the industrial facility. These controllers may be Standard PID controllers. The controllers utilize operating values received from field devices through one or more I/O subsystems 64. Each single control module 60 or redundant control module 60 pair may have a separate I/O subsystem 64. Outputs from the controllers in the control modules 60 are transmitted to the control devices of the field devices through the I/O subsystem 64. The I/O subsystem 64 includes a plurality of I/O modules 66 connected to an I/O bus 68. The control modules 60 are also connected to the I/O bus 68 to receive the operating values from the I/O modules 66.

Generally, the PCU 40 has a configuration similar to the PCU 42, i.e., the PCU 40 has a plurality of control modules 60, a communication bus and I/O subsystem(s) 64.

Figure 4:
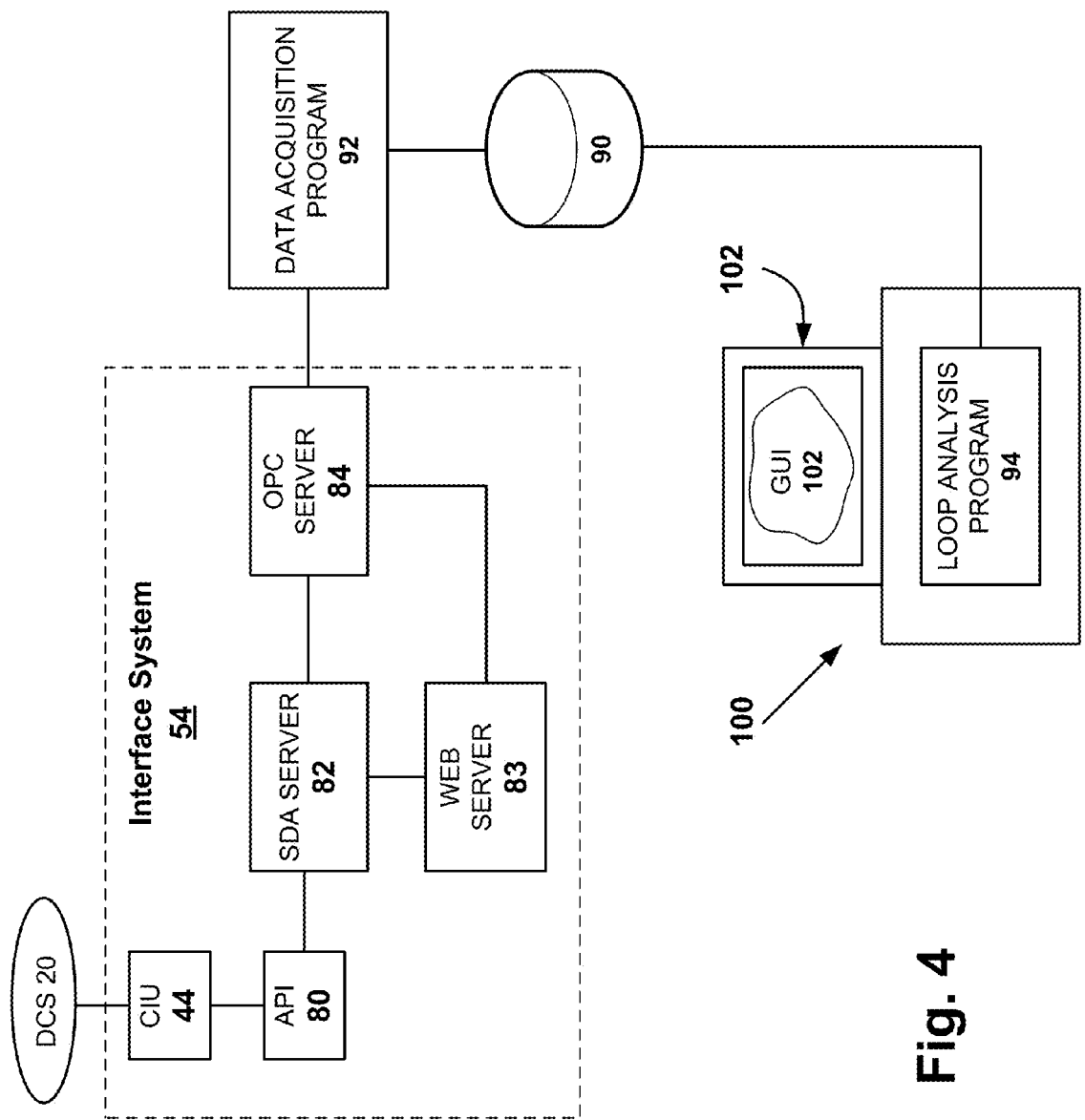
FIG. 4 is a block diagram of an interface system, a data system and a loop analysis program for use with the process control system.

Referring now to FIG. 4, the interface system 54 is operable to provide a connected software application with data from the DCS 20. In one embodiment shown in FIG. 4, the interface system 54 may comprise a software application interface (API) 80, a system data access (SDA) server 82 and an OPC server 84. The details of this embodiment are more fully set forth in U.S. patent application Ser. No. 13/234,726, filed on Sep. 16, 2011, entitled "Intelligent Interface for a Distributed Control System", which is hereby incorporated by reference. Briefly, however, the API 80 is a low level interface comprising a set of 'C' language subroutines that provide access to a native language command set in a CIU 44. Each CIU 44 is comprised of one or more hardware modules that connect a microprocessor-based device (such as workstation 46 or 48) or a PCU (e.g. PCU 40 or 42) to a loop (e.g. loop 22). The SDA server 82 is operable, in a controlled manner, to transmit data requests to and receive data responses from modules in the DCS 20 through an associated CIU 44 and the API 80. The SDA server 82 may control the flow of data through a throttling mechanism that limits the outstanding data requests to the DCS 20, and enforces a maximum request rate. In addition, the SDA server 82 may utilize a topology model that is automatically generated at runtime to determine whether a data request to a particular module in the DCS 20 is valid and is supported by the module. A web server application 83 may be provided to connect the SDA server 82 to any web client using Simple Object Access Protocol (SOAP). The OPC server 84 is operable to publish data from the SDA server 82 via OPC UA and supports connections using both the TCP and HTTP OPC UA communication stacks. The OPC server 84 can perform reads and function calls (where necessary to perform an operation) and provide subscriptions.

Data from the DCS 20 and, in particular, data relating to control loops (controllers) in the control modules 60 is collected through the interface system 54 and may be stored in a database 90 on a computer. A data acquisition program 92 running on the same or different computer may be utilized to collect this data and store it in the database 90. Data from the database 90 and/or data directly from the data acquisition program 92 is utilized by a loop analysis program 94 embodied in accordance with the present invention to monitor the control loops and to identify and diagnose any of those control loops that are experiencing problems.

The computer(s) with the data acquisition program 92, the database 90 and the loop analysis program 94 running/stored thereon may all be located in the same industrial facility as the DCS 20 and may be located proximate to the DCS 20. In such an embodiment, the data acquisition program 92 may continuously collect and store data from the DCS 20 in the database 90, and the loop analysis program 94 may be available at all times to analyze such data as it is received from the data acquisition program 92 and/or retrieved from the database 90. Alternately, the computer(s) with the data acquisition program 92, the database 90 and the loop analysis program 94 running/stored thereon may be located at a site that is remote from the industrial facility and the DCS 20, such as a remote service center. In this embodiment, the data acquisition program 92 may be connected to the interface system 54 over a communication network, such as a wide area network (WAN) or the Internet. Moreover, the data acquisition program 92 may only collect and store data from the DCS 20 in the database 90 for a limited period of time, such as 12 or 24 hours. In still another embodiment, the data acquisition program 92 and the database 90 may be loaded on a portable computer that is connected to the interface system 54 to collect data for a limited period of time, after which time the portable computer is disconnected from the interface system 54 and then transported to the remote site, where it is connected to the computer with the loop analysis program 94 running thereon.

The data that is collected from the DCS 20 may be stored in the database 90 in a data model, wherein data is stored based on the controllers. Each controller has five attributes or subclasses: Process, Setup, Criticality, Section and Utilization in which data relating to the controller is stored. Data for set point, measured value and control output are stored under the Process subclass. Description, controller tuning parameters, output limits, set point limits and execution rate are stored under the Setup subclass. The Criticality subclass includes high, medium and low; the Section subclass includes group and process; and the Utilization subclass includes mode (automatic or manual). The data model facilitates data maintenance and enables fast data retrieval. Moreover, the data model permits optimal use of object oriented programming techniques.

It should be appreciated that the present invention is not limited to use with the DCS 20 or control systems similar thereto. The loop analysis program 94 may be used to monitor and diagnose control loops in other, different kinds of control systems. It should further be appreciated that the loop analysis program 94 can utilize data obtained from a control system by means other than the interface system 54, the data acquisition program 92 and the database 90. The DCS 20, the interface system 54, the data acquisition program 92 and the database 90 are just one example of a control system and a data acquisition system that the loop analysis program 94 can be used with.

The loop analysis program 94 is stored in memory in a computer 100 and is executed by a processor of the computer 100. The loop analysis program 94 has a graphical user interface (GUI) 102 that is operable to generate and display a large number of data views on a monitor 104 of the computer 100. Through visualization, the data views permit an operator to manually analyze the performance of a large number of controllers and determine if there are any problems. The operator may navigate through the views and retrieve information therefrom using one or more interface devices, such as a keyboard, mouse, track ball and our touch screen. In the paragraphs to follow, when reference is made to terms connoting manipulative actions, such as "selected", "clicked on", "dragged", etc. in the context of the GUI 102, it should be understood that the actions are being performed by an operator using the interface device(s).

Figure 5:
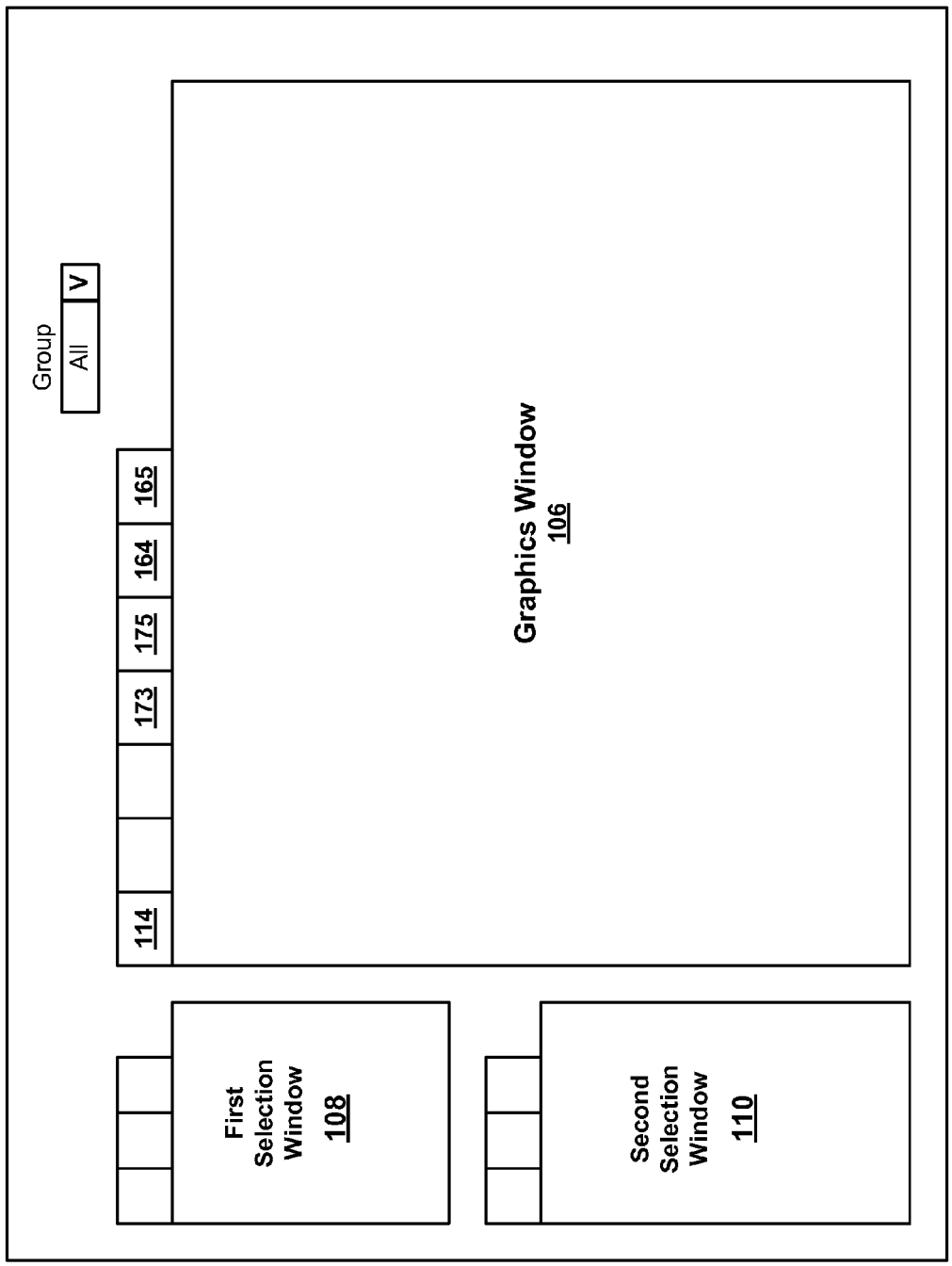
FIG. 5 is a schematic representation of a screen layout of a graphical user interface (GUI) of the loop analysis program.

The GUI 102 presents information to a user through a screen layout 101 schematically shown in FIG. 5. The screen layout 101 includes a graphics window 106, a first selection window 108 and a second selection window 110.

Figure 6:
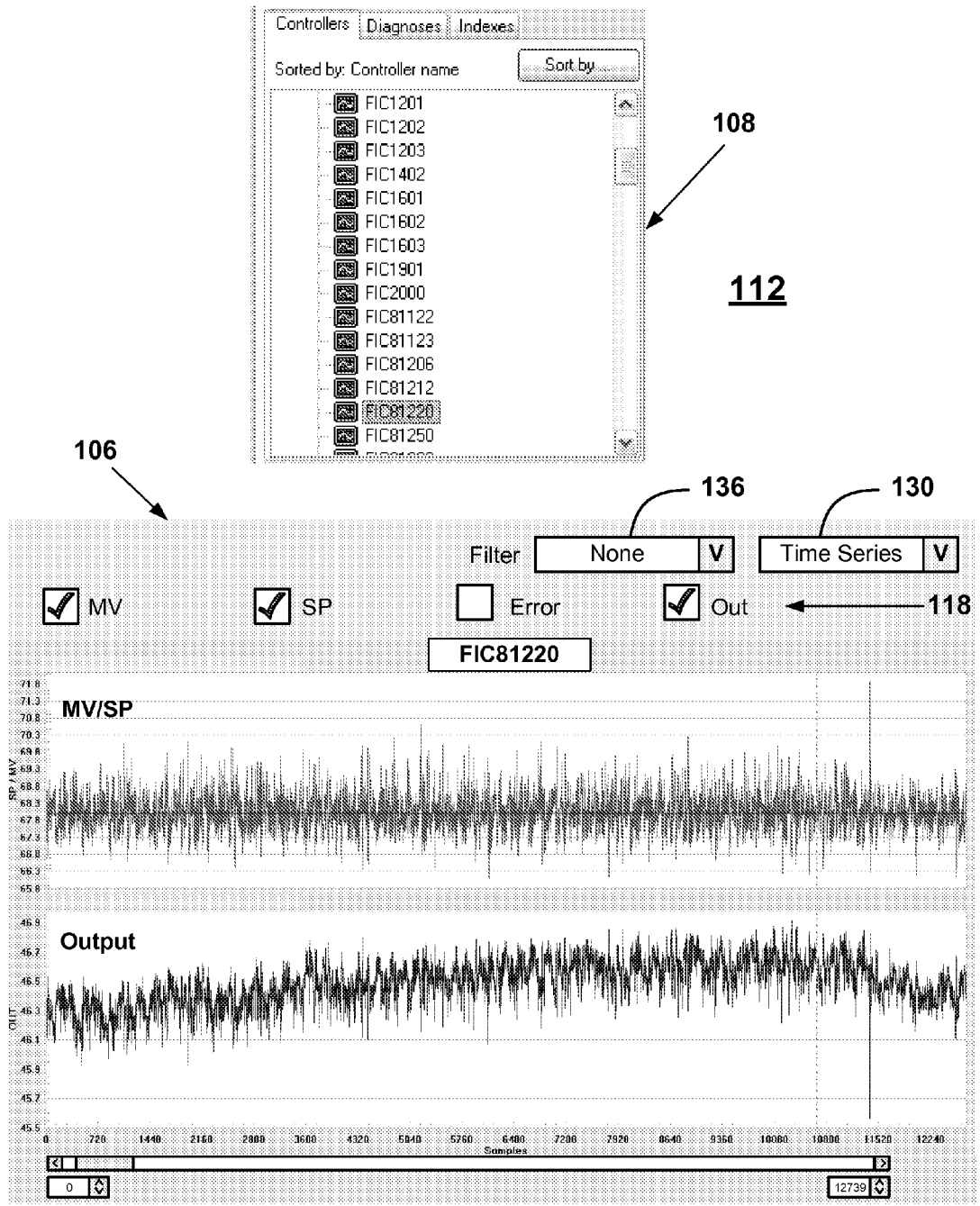
FIG. 6 shows a portion of a display in the GUI having a controller data grouping view.

A first type of data view that may be generated and displayed by the loop analysis program 94 is a controller data grouping view that compares trends for a controller. A portion of a first display 112 having a controller data grouping view is shown in FIG. 6. A tab 114 of the graphics window 106 has been selected so as to display trends in the graphics window 106 and a tab 116 of the first selection window 108 has been selected so as to display a list of controllers. With the tabs 114, 116 so selected, the selection of a controller (such as FIC81220) causes two trends for the controller to be automatically generated and displayed together in the graphics window 106. The two trends are displayed such that Y axes of the two trends are stacked on top of each other, as shown in FIG. 6. The data that is trended is selected by a user by clicking on two or more of check boxes 118 for measured value (MV), set point (SP), Error and controller output (Out), respectively, in the graphics window 106. In the first display 112, the check boxes 118 for SP, MV and Out have been selected. Thus, the top trend is for MV and SP, and the bottom trend is for Out. In FIG. 6, SP (set point) is the substantially straight line extending through the oscillating MV (measured value), which indicates that the set point has not been changed during the trend period. It should be noted that in FIG. 6, the first selection window 108 is shown above the graphics window 106 only for ease of illustration.

Instead of displaying the measured value and the set point in the top trend, the error may be displayed in the top trend. This is accomplished by selecting the Error check box 118 instead of the SP and MV check boxes 118.

Figure 7:
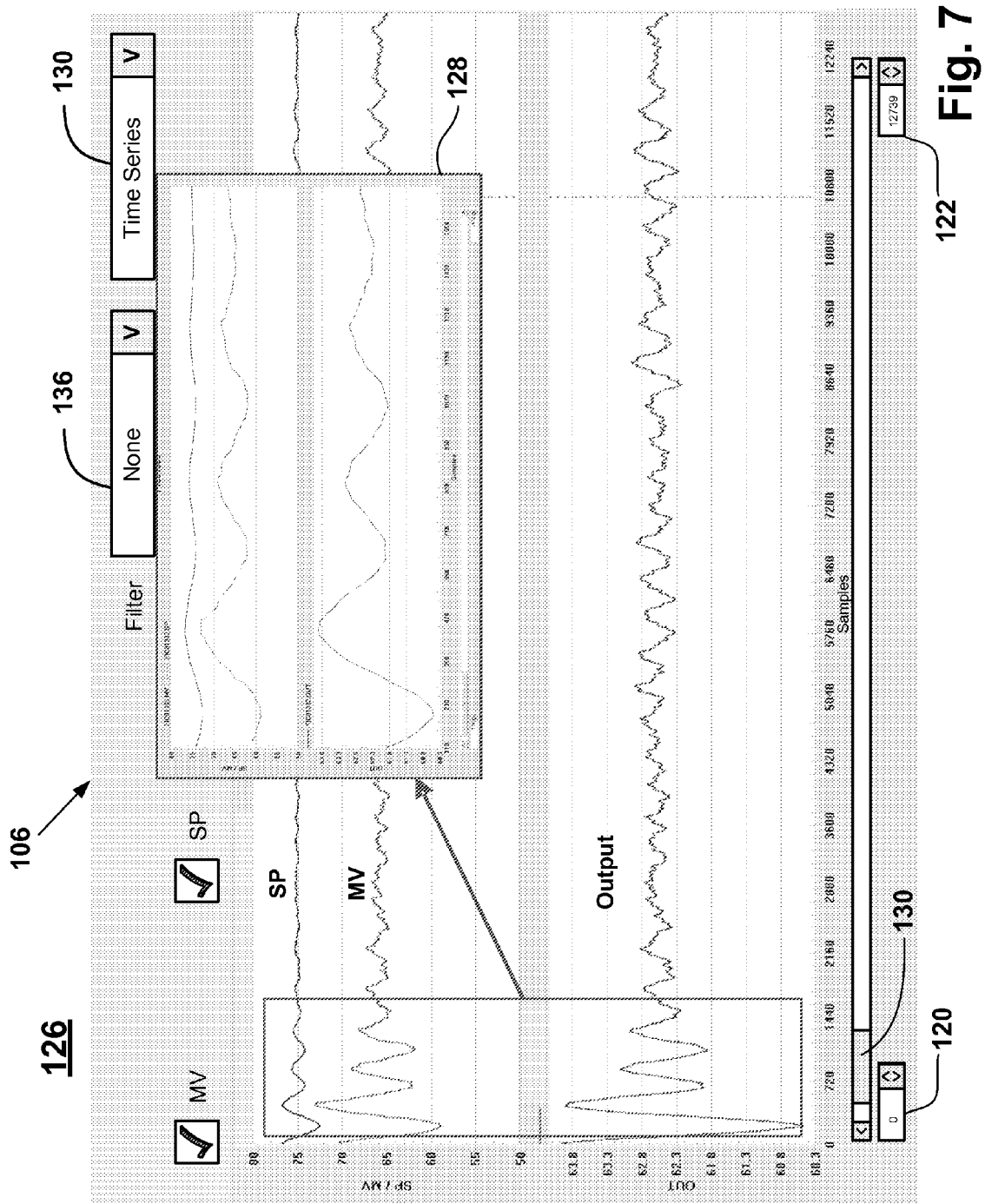
FIG. 7 shows a portion of another display in the GUI having a controller data grouping view and in which a zoom feature is illustrated.

A data range within the top and bottom trends may be zoomed into by entering the data range into boxes 120, 122 in the graphics window 106. This zoom feature is illustrated in FIG. 7, which shows a portion of another display 126 having a controller data grouping view. Before zooming into a particular data range, box 120 contains "0" and box 122 contains "12739". Thus the displayed trends have a normal data range of 0-12739. A smaller data range of, for example, 100-1600 is zoomed into by entering "100" into box 120 and entering "1600" in box 122. The trends for this smaller data range fill the trend boxes 112, 114, thereby effectively enlarging the trends for the data range. The zoomed-into data range is shown in box 128 for illustrative purposes only. Other data ranges within the normal data range may be zoomed into by moving a scroll bar 130, thereby moving the zoomed-into data range along the x-axis. The width of the data range, however, will stay at 1500, unless changed by entering a different value into at least one of the boxes 120, 122.

The data of the trends may be analyzed utilizing analysis tools accessible through a drop down analysis box 130. With reference now to FIGS. 8 and 9, the tools available for selection through the analysis box 130 include: "Time Series", "Difference", "Power Spectrum", "Amplitude Spectrum", "Auto Correlation", "Histogram" and "Local Variability". In FIG. 8, a portion of a display 132 with a controller data grouping view is shown, while in FIG. 9, a portion of another display 134 of a controller data grouping view is shown. In the display 132, the Time Series Tool is being used to display trends for a controller FIC1002G. The Time Series tool is the normal (default) tool that causes a value (0-100%) of SP/MV/ Error, Out (Y-axis) to be plotted against time (X-axis). In the display 134, the Power Spectrum tool is being used to display trends for the controller FIC1002G. The Power Spectrum tool measures the power of SP/MV/Error, Out and then plots it (Y-axis) against frequency (X-axis). Selection of an analysis tool in the analysis box 130 immediately causes the trends created by the selected analysis tool to be automatically displayed in the graphics window 106.

The data of the trends may be filtered to remove noise using either an exponential filter or a Blackman filter. The selection of not using a filter, or using the exponential filter or the Blackman filter is made through a drop down filter box 136. Selecting a filter through the filter box 136 automatically causes the data of the trends to be filtered.

A second type of data view that may be generated and displayed by the loop analysis program 94 is a table view showing the application of numerical methods to data of the controllers. In FIG. 10, a portion of a display 140 having a numerical methods table view is shown. The display 140 includes a table 141 with tabs for the different data, namely: MV, SP, Out, Error and loop performance monitor (LPM) data, which is discussed below. The table 141 is shown in the graphics window 106. The numerical methods that are applied include standard deviation, the coefficient of variation (CoV), maximum, minimum, mean, average and range. Selecting a tab in the table 141 for particular data causes the table 141 to show rows and columns, wherein each row is for a different controller and each column is for a different numerical method applied to the particular data of a controller. The controllers can be sorted based on the different data (MV, SP, Out, Error and LPM). Thus, one group of controllers may only be shown for LPM data, another, different group of controllers, may only be shown for MV and so on.

The LPM data is produced by numerical methods performed by standard software routines stored in an LPM library or database associated with the loop analysis program 94. The standard LPM data software routines include LPM: 01, LPM:02, LPM:03 and LPM:04, which are shown in FIG. 10. LPM:01 calculates the mean control error, SP-PV; LPM: 02 calculates the standard deviation of the normalized control error; LPM:03 calculates the standard deviation of the control error in engineering units; and LPM:04 calculates the mean process variable, current operating point. Some other standard software routines include: LPM:13, which determines the percentage of samples where the loop (controller) is in automatic; LPM:14, which determines the percentage of samples in which the loop is saturated; LPM:17, which determines the ratio number of set point crossings and all samples; and LPM:19, which calculates the ratio movement of SP and PV.

The LPM library also includes standard software routines that analyze LPM data to determine various performance indicators (results) for a control loop (controller). Some of the standard LPM results routines include: H01, which determines whether overall performance is acceptable; H02, which determines whether there is an overall tuning problem; H03, which determines whether the control loop is oscillatory; H04, which determines whether the SP is oscillatory; H05, which determines whether there is a significant external disturbance; H06 which determines whether there is significant nonlinearity; H07 which determines whether there is valve stiction; P01 which determines whether there is an acceptable Harris Index; P02 which determines whether there is an acceptable SP crossing index; and P03 which determines whether variability is random.

The controllers may also be sorted based on controller type, process area, criticality and user-specified sort criteria.

Figure 11:
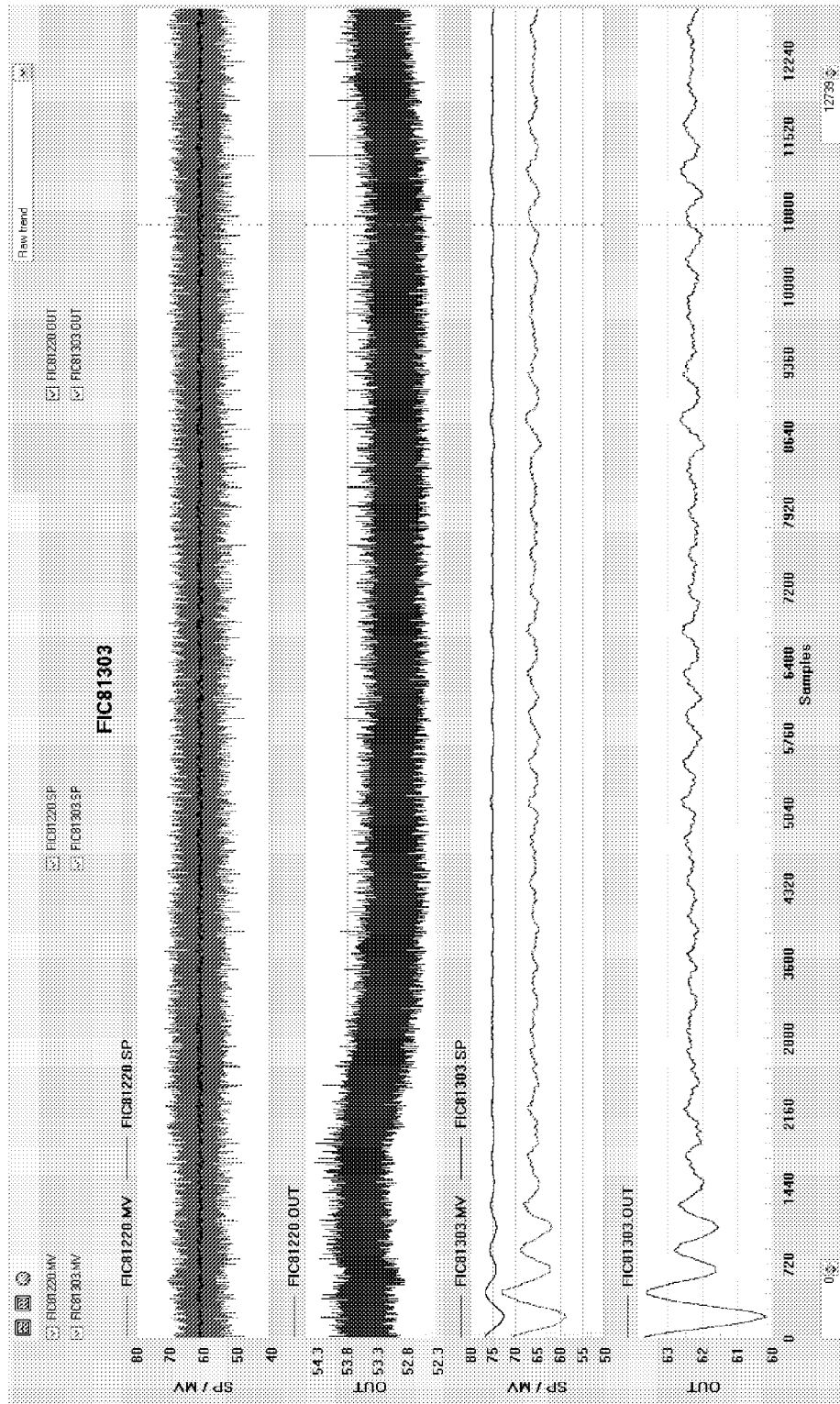
FIG. 11 shows a portion of a display in the GUI having a controller comparison view.

A third type of data view that may be generated and displayed by the loop analysis program 94 is a controller comparison view showing trends for two different controllers. In FIG. 11, a portion of a display 148 with a controller comparison view is shown, wherein trends of a controller FIC81303 are being compared to trends of a controller FIC81220. The trends are shown in the graphics window 106. The trends for each controller include an MV/SP trend and an Out trend. A particular controller (e.g. FIC81303) may be compared against any of the other controllers in the DCS 20. Thus, a user can compare the performance of a controller with all other controllers in a quick, visual manner and thereby detect similar wave forms, i.e., performance characteristics. Such detection can facilitate the identification of a problem effecting more than one controller.

A fourth type of data view that may be generated and displayed by the loop analysis program 94 is a controller property view. In FIG. 12, a portion of a display 152 having a controller property view is shown. A user can quickly visualize information related to a set point of a selected controller. More specifically, current numerical values of MV, SP and Out are shown, together with the high and low limits for the MV, SP and Out. In addition, the numerical values of the tuning parameters (proportional, integral and derivative) of the controller are shown, as well as the Auto status of the controller, i.e., whether the controller is in automatic mode. Viewing the controller property view, while viewing process data helps a user determine whether a problem is control or process related.

Figure 13:
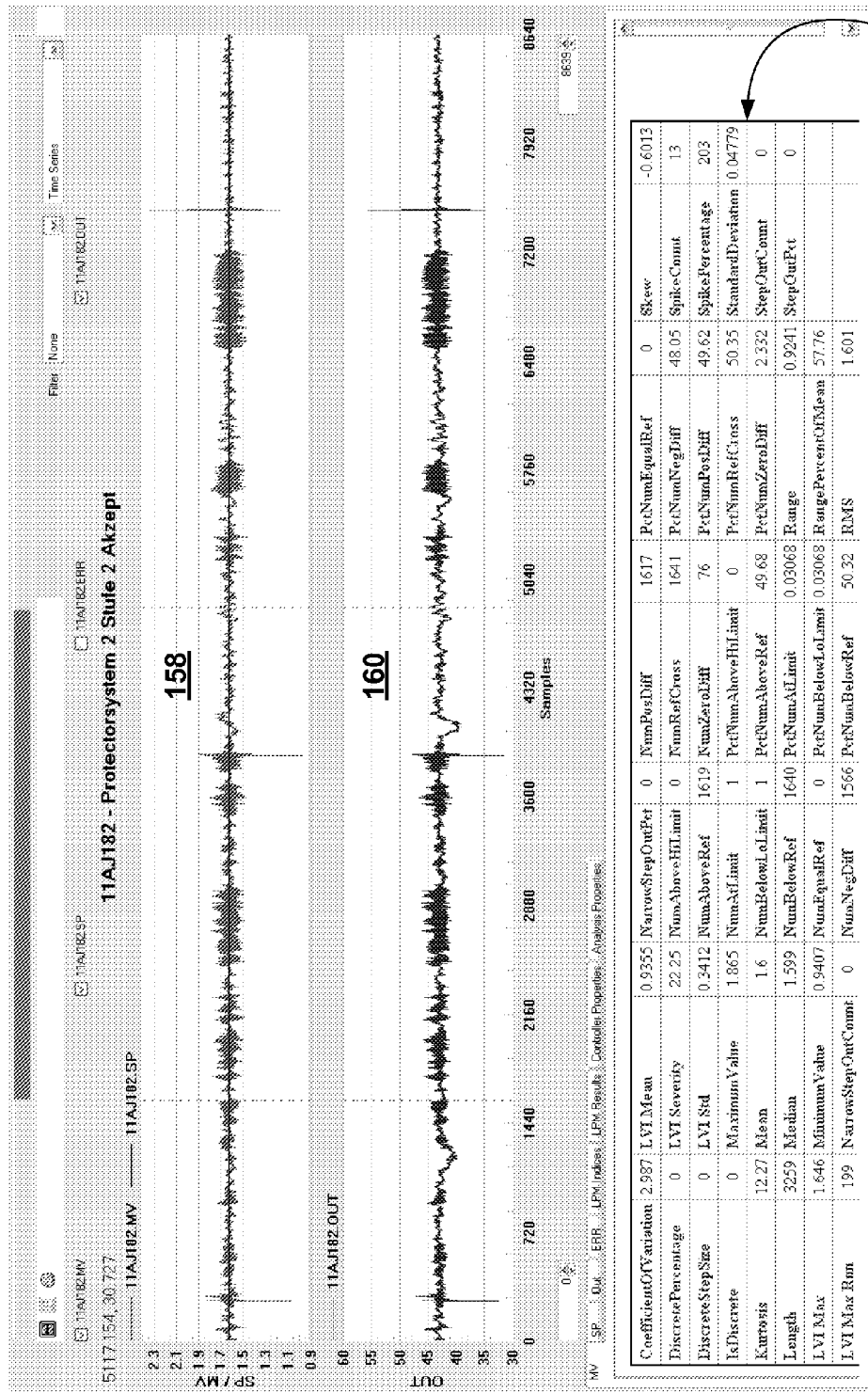
FIG. 13 shows a portion of a display in the GUI having a combined process and numerical data view.

Referring now to FIG. 13, a portion of a display 156 having a fifth type of data view is shown that may be displayed by the loop analysis program 94. The fifth type of data view is a combined process and numerical data view. As shown, a numerical data view has two trend boxes 158, 160 disposed above a numerical methods table 162. In the same manner as a controller data grouping view, the data that is trended is selected by a user by clicking on two or more check boxes for MV, SP, Error and Out, respectively, in graphics window 106. In FIG. 13, the check boxes for SP, MV and Out have been selected for a controller 11AJ182. Thus, the top trend in trend box 158 is for MV and SP of the controller 11AJ182, and the bottom trend in trend box 160 is for Out of the controller 11AJ182. The numerical methods table 162 shows the application of numerical methods to data of the controller and includes tabs for the different data, namely: MV, SP, Out, Error and LPM. The numerical methods that are applied include standard deviation, CoV, Kurtosis, maximum, minimum, mean, average, range, etc. Selecting a tab for particular data displays a table containing columns of different numerical methods applied to the particular data. In FIG. 13, the numerical methods are applied to MV of the controller 11AJ182.

A sixth type of data view that can be generated and displayed by the loop analysis program 94 is a data clustering view, which permits two data types to be plotted against each other in a two-dimensional plot, or three data types to be plotted against each other in a three-dimensional plot. A two-dimensional data clustering view is accessed by clicking on the tab 164 of the graphics window 106, while a three-dimensional data clustering view is accessed by clicking on the tab 165 of the graphics window 106. A data clustering view includes a plot window 168 and a trend window 170 (shown in FIG. 14). A data clustering view is particularly useful for detecting and analyzing linearity, hysteresis and stiction. Hysteresis occurs when the amount of movement of a final control element (FCE) in response to the same command from a controller (in terms of magnitude) is different in different directions of movement. Stiction occurs when a controller commands an actuator to move an FCE, but the FCE does not respond until additional force is applied by the actuator and then the FCE overshoots.

Figure 14:
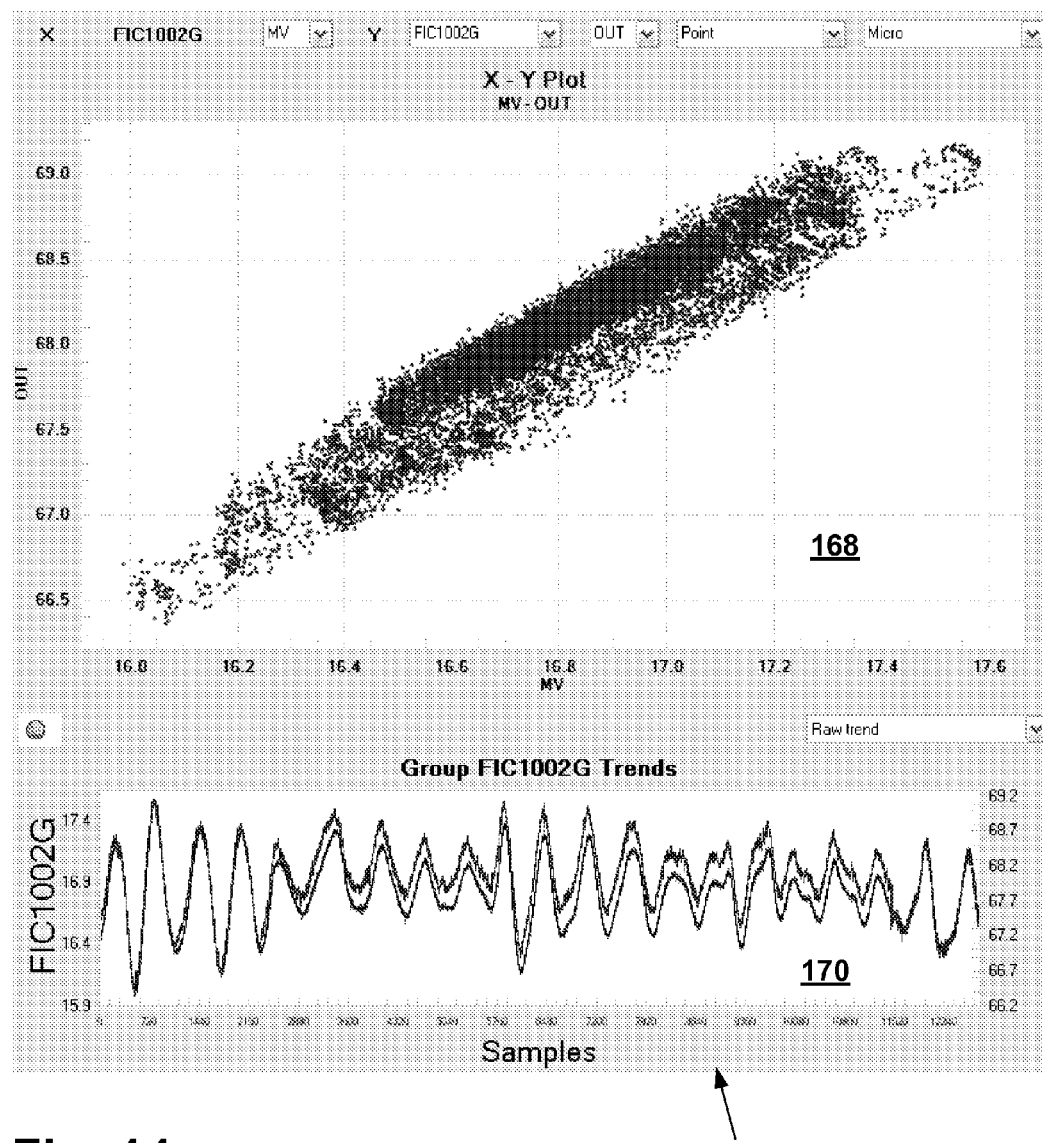
FIG. 14 shows a portion of a display in the GUI having a two-dimensional data clustering view.

Referring now to FIG. 14, a portion of a display 166 having a two-dimensional data clustering view is shown. In the plot window 168, there is a two-dimensional plot of MV versus Out of a controller FIC1002G. The trend window 170 shows the trends of MV and Out of controller FIC1002G, with time being on the X-axis, MV being on the left side of the Y-axis and Out being on the right side of the Y-axis. The offset between the Out and MV shown in the plot window 168 and the trend window 170 shows a non-linear problem that is probably related to hysteresis in the actuator associated with the controller FIC1002G.

Figure 15:
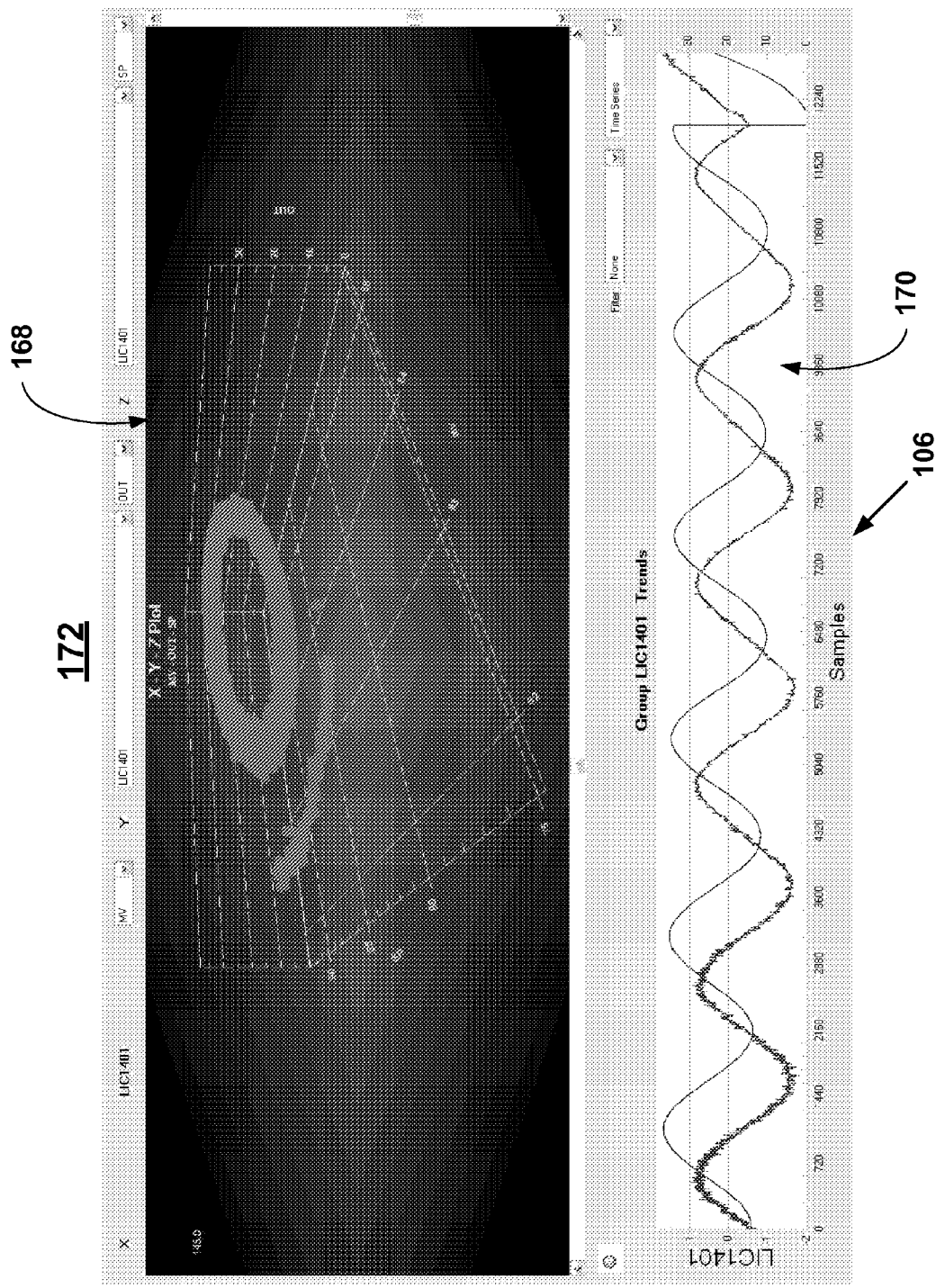
FIG. 15 shows a portion of a display in the GUI having a three-dimensional data clustering view.

In FIG. 15, there is shown a portion of a display 172 of a three-dimensional data clustering. The plot window 168 shows a three-dimensional plot of MV, Out and SP of a controller LIC1401, with MV being on the X-axis, Out being on the Y-axis and SP being on the Z-axis. The trend window 170 shows the trends of Error and Out of controller LIC1401, with time being on the X-axis, Error being on the left side of the Y-axis and Out being on the right side of the Y-axis. The donut shape plot in the plot window 168 indicates stiction and hysteresis in the actuator associated with the controller LIC1401.

A seventh type of data view that can be generated and displayed by the loop analysis program 94 is a controller parameter clustering view, which for a plurality of controllers permits two properties of each controller to be plotted against each other in a two-dimensional (XY) plot or three properties of each controller to be plotted against each other in a three-dimensional plot (XYZ). A two-dimensional controller parameter clustering view is accessed by clicking on a tab 173 of the graphics window 106, while a three-dimensional controller parameter clustering view is accessed by clicking on a tab 175 of the graphics window 106. A controller parameter clustering view enables a user to quickly determine whether the overall control system 20 is operating well or poorly. The utility of a controller parameter clustering view is based on the utility of the direct synthesis (lambda) tuning technique. In this tuning technique, the dynamics of a controller are matched to the dominant dynamics of the process. For example, most flow control loops have a time constant ranging from 5 to 20 seconds. Thus, pursuant to the direct synthesis tuning approach, the integral tuning parameter of a standard PID controller for a flow control loop should also be from 5 to 20 seconds. Moreover, the proportional tuning parameter should be 1 or less. Thus, pursuant to the direct synthesis tuning technique, if most of the PID controllers in the flow control loops have an integral tuning parameter in the range of 5-20 seconds and a proportional tuning parameter of 1 or less, then the control system 20 is probably operating well. A controller parameter clustering view permits this to be quickly ascertained in a single view.

Figure 16:
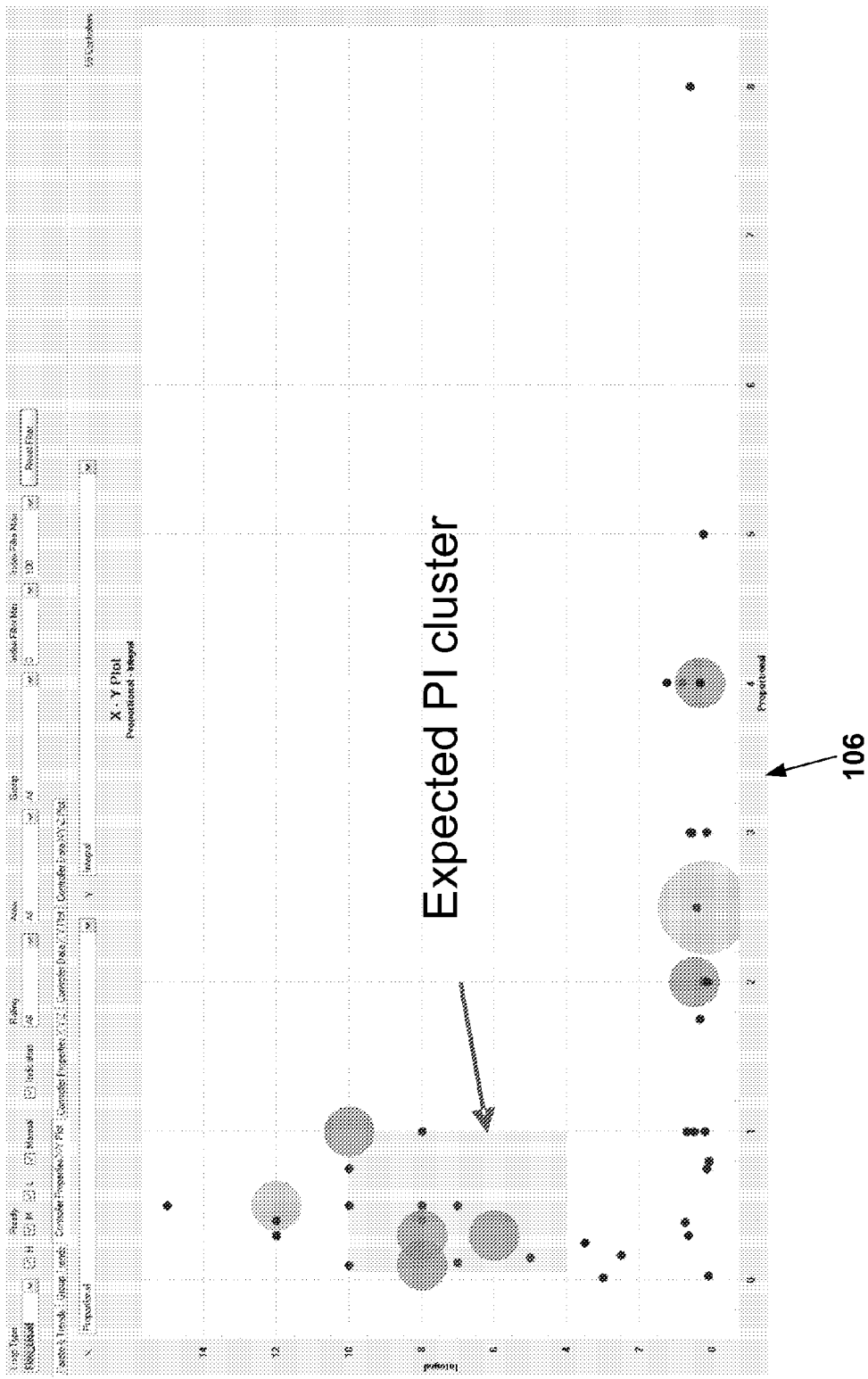
FIG. 16 shows a portion of a display in the GUI having a two-dimensional controller parameter clustering view.
Figure 17:
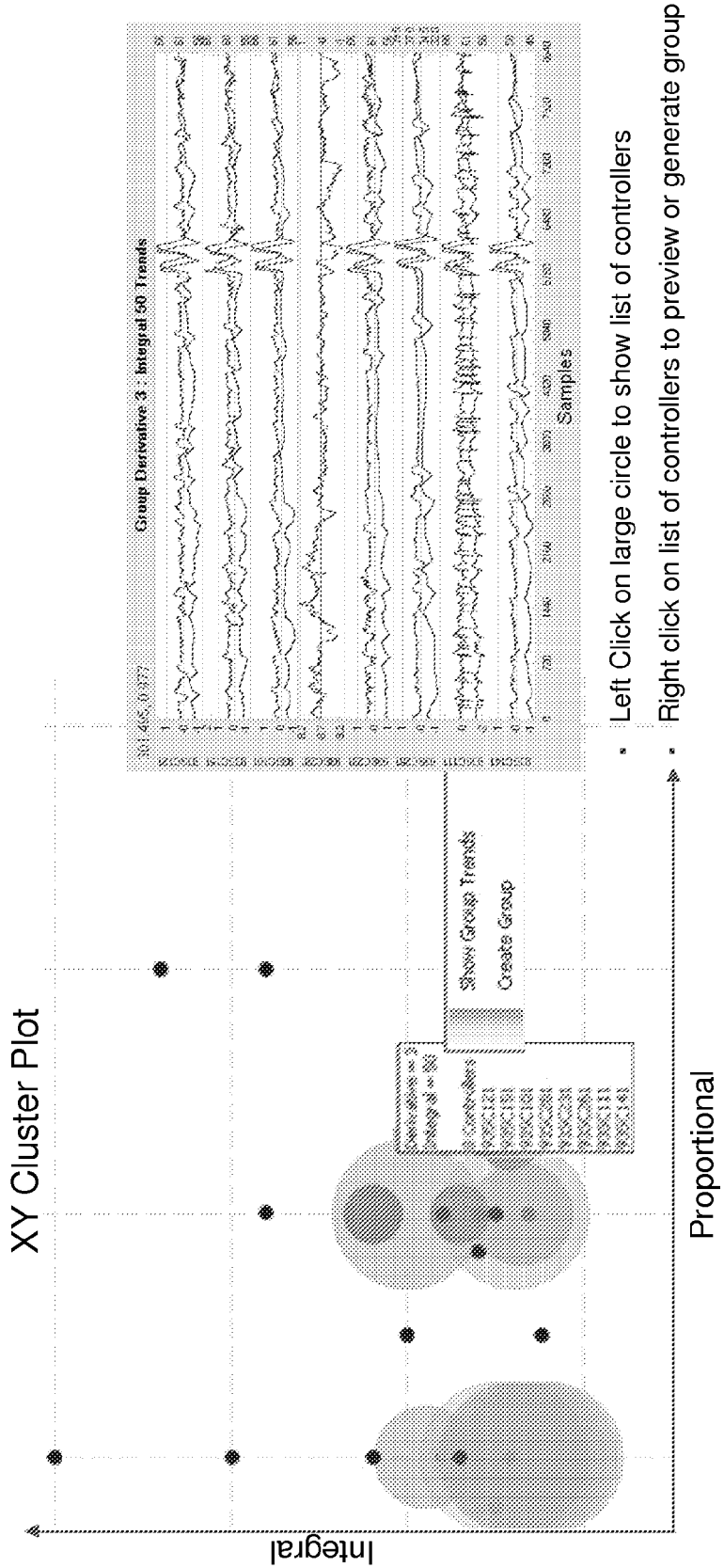
FIG. 17 shows a portion of a display in the GUI having a two-dimensional controller parameter clustering view, schematically showing how a user can access additional data from the view.

Referring now to FIG. 16, there is shown a portion of a display 174 having a two-dimensional controller parameter clustering view. For a plurality of controllers, the integral tuning parameter (Y-axis) of each controller is plotted against the proportional tuning parameter (X-axis) of the controller in a graph. As shown, a unique feature of the two-dimensional controller parameter clustering view is that it permits visualization of the number of controllers that have the same proportional and integral (PI) tuning parameter values. More specifically, for a particular set of PI tuning parameter values (XY coordinates), a dot is shown having a size (diameter) that is directly proportional to the number of controllers that share the set of PI tuning parameter values (XY coordinates). In other words, for a particular set of PI tuning parameter values (XY coordinates), the dot size grows with the number of controllers having the set of PI tuning parameter values (XY coordinates). As schematically shown in FIG. 17, if a user left clicks (with a mouse or other pointing device) on an enlarged dot, a pop-up window appears in the graphics window 106 showing a list of all of the controllers that are represented by the enlarged dot. If a user right clicks on the list of controllers, a controller comparison view for all of the controllers in the list appears in the graphics window 106, wherein the trends of all of the controllers are displayed.

Another feature of the two-dimensional controller parameter clustering view is that it permits the display of a user-defined target area in the graph in which the PI tuning parameter values of the controllers are expected (desired) to be located. In FIG. 16, a target area is displayed that is delimited by a proportional tuning parameter of about 0.1 to about 1 and an integral tuning parameter of about 4 to about 10, which is in accordance with the direct synthesis tuning technique. As shown, a considerable number of controllers have PI tuning parameter values that are outside this target area, thereby indicating relatively poor overall control of the control system 20.

Figure 18:
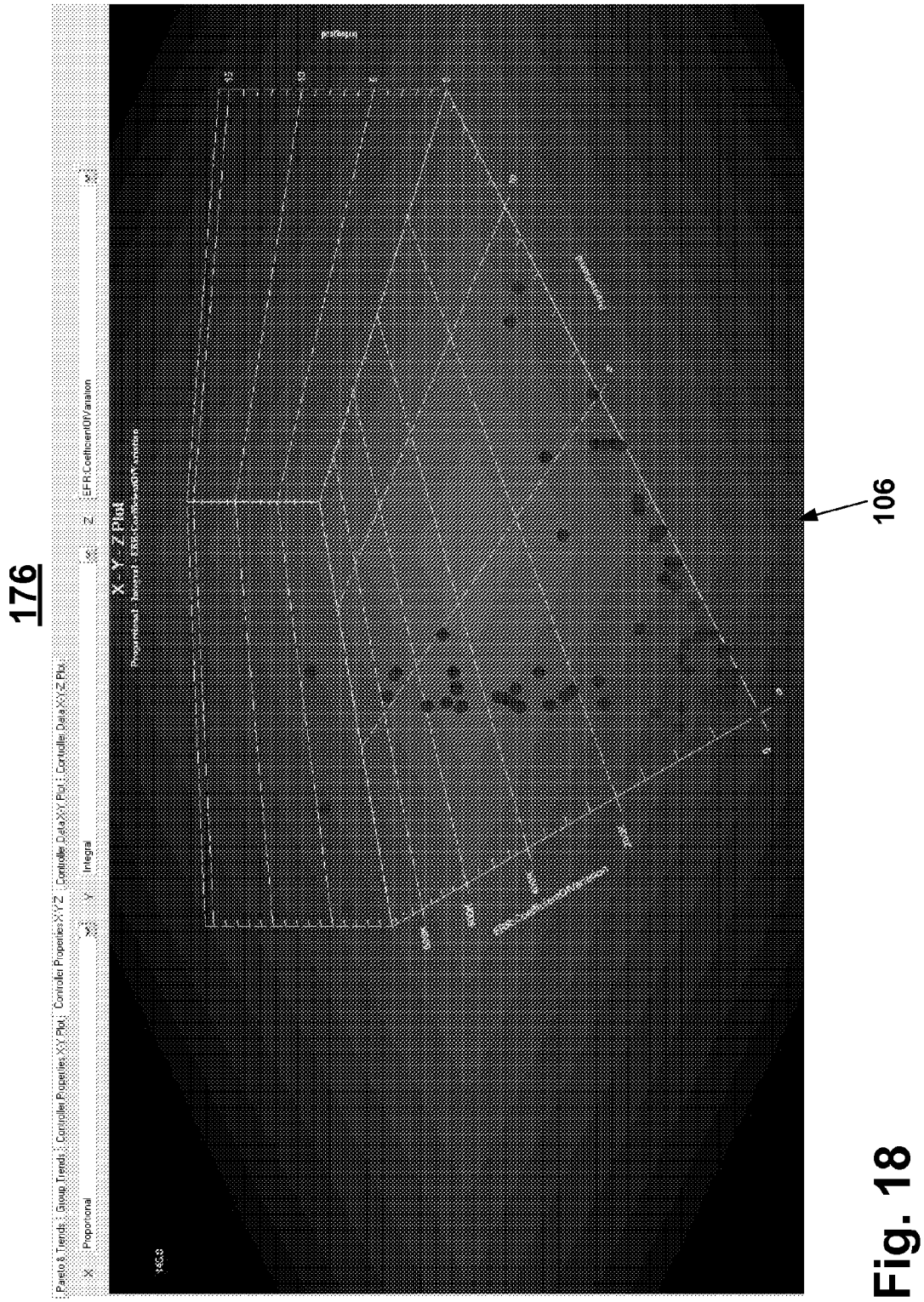
FIG. 18 shows a portion of a display in the GUI having a three-dimensional controller parameter clustering view.

Referring now to FIG. 18, there is shown a portion of a display 176 having a three-dimensional controller parameter clustering view. For a plurality of controllers, the proportional tuning parameter of each controller is plotted on the X-axis, the integral tuning parameter of the controller is plotted on the Y-axis and the error (coefficient of variation) of the controller is plotted on the Z-axis. As shown, those controllers having poor PI tuning parameter groupings mostly have large errors.

The data views described above permit manual analysis of controllers through visualization. This manual analysis may be used to generate assessments (states and/or values) of key performance indicators (KPIs) of the controllers. The state of the KPI is used to indicate the presence of a problem and is boolean in nature (e.g., no problem/problem, good/bad, no/yes), wherein a "problem", "bad" or "yes" indicates the presence of a problem. The value of a KPI may be used to indicate the quality of the control aspect underlying the KPI or the magnitude of a problem and may be based on a scale, such as 0-100%, with 0% indicating the best quality and 100% indicating the worst quality (biggest problem). In addition to providing for manual generation of KPI assessments, the loop analysis program 94 also provides for automatic generation of KPI assessments and a combination or hybrid generation of KPI assessments, which utilizes both manual and automatic generation of KPI assessments. KPIs generally fall into one of four categories: point, data window statistical analysis, persistence and time trend transforms.

A point KPI simply compares a measurement to a threshold and if the measurement exceeds the threshold, the state of the KPI changes, such as from no problem to problem and an action is generated, e.g., an alarm is generated and annunciated.

A data window statistical analysis KPI uses a window of data (an amount of statistically relevant data) and maps it into a statistical result. Examples of statistical mapping include: mean, mode, median, maximum, minimum, standard deviation, variance, CoV and slope. Once the statistical value has been determined for the window size, the statistical result is then used much like the point KPI method. For example if the variability of a data set window is calculated and the standard deviation is above a threshold, then the state of the KPI changes and a corresponding action is triggered.

A persistence KPI is utilized to avoid false positives, which can occur with a point KPI. A false positive is defined as a KPI that exceeds its threshold but for a reason that is not related to an actual problem. A noise spike, a machine shut down, a production change, etc. can all cause a false positive. Often a persistence KPI is applied to a point KPI. A persistence KPI can be implemented in a number of ways. One type of persistence KPI is simply a count of the number of times a point KPI threshold is exceeded in a user-defined analysis window. Another type of persistence KPI is an evaluation of the time a threshold is exceeded.

A time trend transform KPI utilizes mathematical analysis of a data window. Often a series of transforms are applied to a data window. These transforms can include the Fourier series, auto correlations, histograms, etc. A time trend transform converts the window of time based data into a new domain. The new domain allows for details that may be hidden in the original time trend to be more easily detected. For example, a time trend that has a pure tone oscillatory nature may be difficult to detect in a time trend. However, if that time trend is converted to the Fourier series, then the amplitude and frequency of the oscillatory problem can be easily detected.

Figure 19:
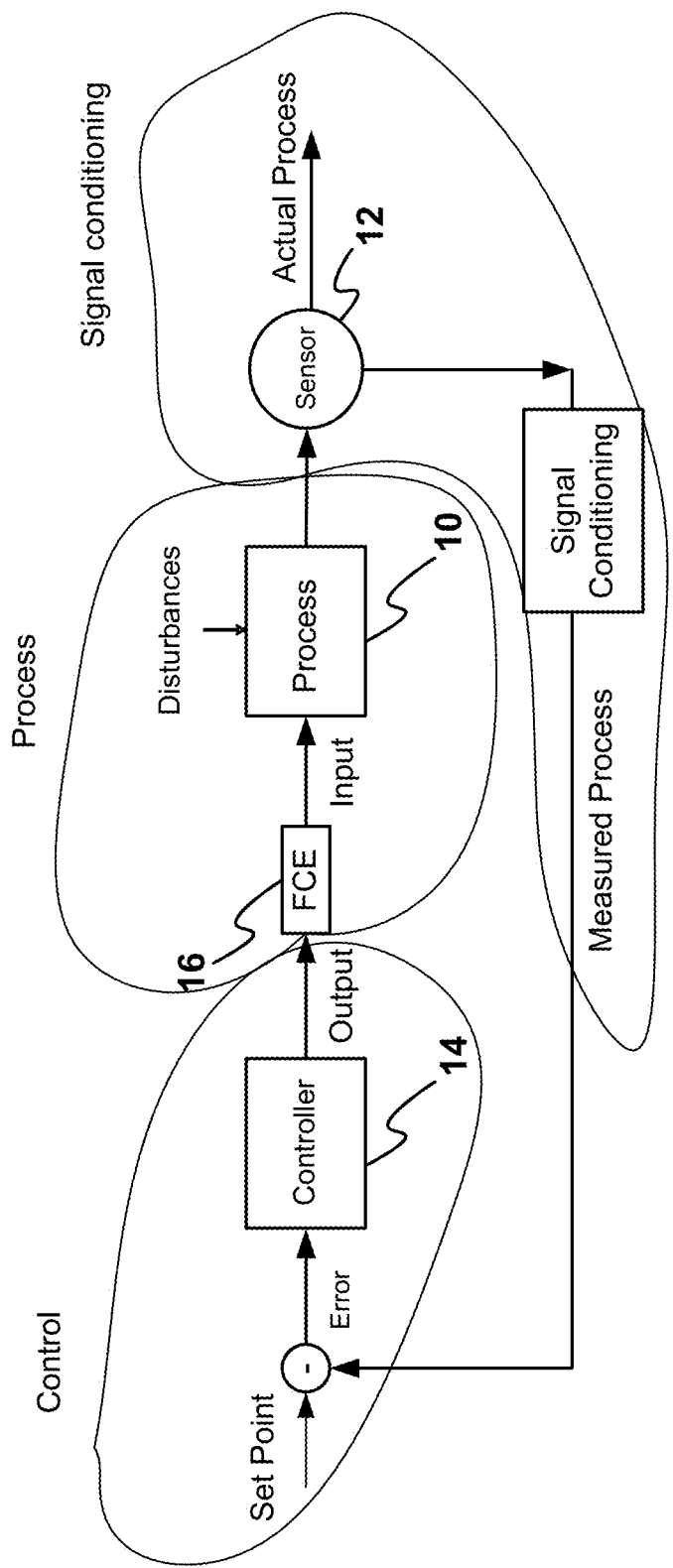
FIG. 19 shows the control loop block diagram of FIG. 2 divided into three areas.

The loop analysis program 94 facilitates manual generation of KPI assessments and hybrid generation of KPI assessments by utilizing predefined loop problems or issues that are classified into three different areas of a typical control loop, namely control, process and signal conditioning. Generally, the control area concerns the operation of the controller 14, the process area concerns the operation of the FCE 16 and the condition or state of the process 10, and the signal conditioning area concerns the condition of the MV signal that is provided to the controller 14. The condition of the MV signal is dependent on the operation of the sensor 12 that measures the MV, the operation of signal conditioning devices, such as A/D converters and filters, the condition of the signal transmission medium (e.g., wiring) and environmental noise. Referring now to FIG. 19, the loop block diagram of FIG. 2 is shown divided into the three areas. Some of the commonly found issues in the three areas are set forth in the following paragraphs.

In the control area, the issues of concern are those that keep the error away from zero. Such issues may involve: tuning parameters; type of control algorithm used; setup parameters related to high and low ranges for set point, output, and process variable; number of decimal points used; controller execution rate; control deadbands; additional degrees of freedom, such as non linearity compensation options: tuning parameter scheduling, "beta" factor and adaptive control; data out of range: wind up, loop is off (manual); offset from set point; rate of change of output; rate of change of set point; and filtering.

In the process area, the issues of concern are those that cause the process to change in ways that are not consistent with the final control element (FCE). Such issues may involve: disturbances that are more powerful than the FCE; process nature changes; process non-linearity (e.g., surface area vs. level in a horizontal cylindrical tank); FCE issues: stiction, backlash, hysteresis, resolution (on time, pulse width), FCE size, FCE type, differential pressure drop across FCE, cavitation, vena contracta, cam issues, drive issues; actuator issues; and process out of range.

In the signal conditioning area, the issues of concern are those that cause the actual process variable and measured process variable to be different. Such issues may involve sample time; filtering; quantization; deadbands; compression; compensation; calibration; saturation; decimal points; dead signals; spikes; outliers; non-Gaussian noise; noise bursts; and square root extraction.

The foregoing lists show that there are a myriad of factors that can cause the performance of a control loop to degrade. In the present invention, these factors are grouped and arranged into a structured format of pre-defined major KPIs that facilitates manual generation of KPI assessments and hybrid generation of KPI assessments. The structured format may take the form of the following table:

TABLE 1

| CONTROL | PROCESS | SIGNAL CONDITION |
|---|---|---|
| C1: Static Output | P1: FCE Out of Range | S1: Quantized |
| C2: Oscillating Set point | P2: FCE Size | S2: Excessive Noise |
| C3: Deadband | P3: FCE Problem | S3: Spikes |
| C4: Offset | P4: FCE Leakage | S4: Step Out |
| C5: Over-Control | P5: Intermittent Disturbance | S5: Compression |
| C6: Slow-Control | P6: Persistent Disturbance | S6: Over Filtered |
| C7: FCE Travel | P7: Questionable | S7: Sampling Rate |
| C8: Slow Update Rate | | S8: No Signal |
| C9: Questionable | | S9: MV Out of Range |
| | | S10: Questionable |

Assessments of the foregoing major KPIs may all be manually generated. Most of the assessments of the major KPIs may also be automatically generated. A brief description of the major KPIs is set forth in the following paragraphs.

C1 indicates excessive periods of manual control in the data set. Manual control is not deduced from a mode tag, which may or may not be available. Instead, this major KPI is deduced from the Out signal.

C2 indicates an oscillatory set point signal. An oscillating set point signal means that the set point is being driven by a cascade, ratio or feed forward arrangement.

Figure 20:
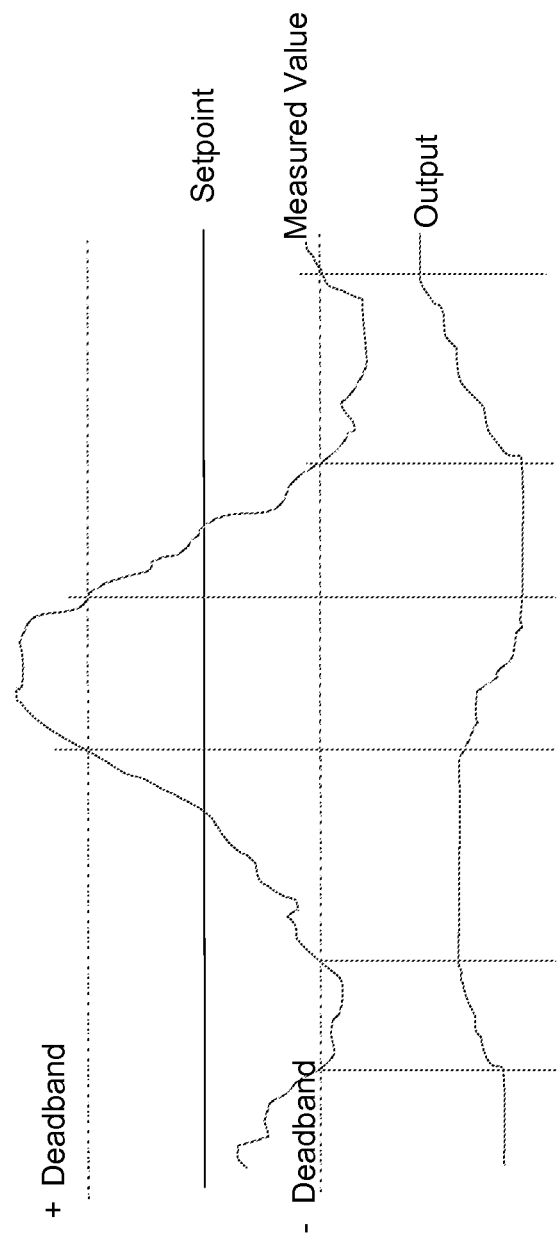
FIG. 20 shows data trends of a controller having a significant deadband.

C3 indicates a controller has a significant deadband, thereby decreasing the performance of the controller. C3 is only manually (visually) determined. As shown in FIG. 20, controller output (Out) only moves when the measured value (MV) is outside the deadband. In other words, the error is determined to be zero when inside the deadband. A controller deadband may be caused by the controller itself or by the resolution of an actuator, i.e., the actuator can't be moved small enough. In this latter situation, a deadband can be useful because the error should be considered zero when corrections smaller than the smallest possible actuator change are being requested.

C4 indicates a non-zero control error that a controller cannot remove. Typically, this indicates a problem in the controller, most likely missing integral action.

C5 indicates that a control loop (controller) is too tightly tuned, thereby leading to clear oscillatory behavior in the controller output (Out). Over-control occurs when the control settings are too aggressive and disturbance rejection results in a strong under-damped response. This condition may be caused by too large of a proportional tuning parameter and too small of an integral tuning parameter.

C6 indicates that a control loop (controller) is too sluggishly tuned, thereby leading to a higher than necessary variability with strong auto-correlation and long periods where SP and MV deviate. This condition may be caused by too small of a proportional tuning parameter and too large of an integral tuning parameter.

C7 indicates excessive FCE movement, which can lead to wear and performance degradation after a period of time. This condition can be caused by excessive noise in the MV or too high of a derivative tuning parameter. The MV may be filtered by a small filter (e.g., one that is 5 to 10 times smaller than the process time constant) or by detuning the controller to remove or reduce the derivative component.

C8 indicates that the controller is executing too slowly compared to the nature of disturbances and process dynamics.

C9 is a catch-all category for situations where something is wrong with the control, but the situation does not fit into any of the other control (C) categories. C9 is only manually (visually) determined.

P1 indicates that the controller output is saturated. This condition typically occurs when the disturbance energy is bigger than the corrective action available. The controller is trying to "windup" or push the FCE beyond its hardware limitations. Usually, the disturbance energy is just too big or the FCE (e.g. valve) is too small or the FCE is broken.

P2 indicates that the FCE mostly operates above 90% or below 10% of its operating range. If so, the FCE is either under- or over-dimensioned. This per se does not mean a serious problem but indicates improvement potential.

Figure 21:
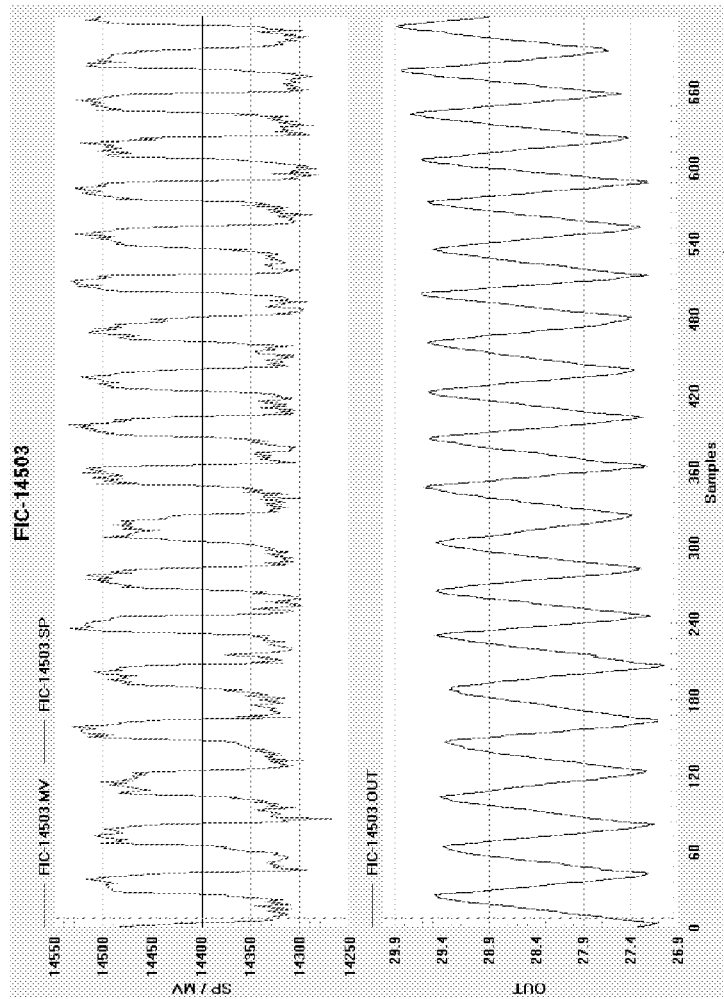
FIG. 21 shows a portion of a display in the GUI having a controller data grouping view for a controller having a self-regulating wave-form combination.

P3 indicates an FCE-related problem that results in a cyclic behavior of MV and Out. Two different wave-form combinations (in the trends) will provide this indication: self-regulating and non-self-regulating. In this regard, it should be noted that a self-regulating process is a process that stops moving with a single step change of an actuator. A non-self-regulating process is one that moves in an integrating fashion as a result of a step change in an actuator. A tank with a fixed output and a controlled input is an example of a non-self-regulating process. The self-regulating wave-form combination is square wave in the MV and a triangle wave in the Out. The non-self-regulating wave-form is a triangle wave in both the MV and the Out. A valve stiction and hysteresis issue typically appears as a self-regulating wave-form combination. A portion of a display 180 of a controller data grouping view, showing a self-regulating wave-form combination, is shown in FIG. 21. As shown, there is a square wave in MV and a triangle wave in Out.

P4 indicates a sensor calibration error or FCE leakage. A wave-form combination (in the trends) that provides this indication is a zero Out and an MV that is still present or moving. A zero Out means that the FCE is not operating (e.g. the valve is shut). In the case of a valve, if the valve is shut and the MV is still present or moving, the valve either has broken seals or is not calibrated correctly.

P5 indicates a non-periodic disturbance. By way of example, a non-periodic disturbance may be caused by a drop in inlet pressure due to large demand elsewhere in the process, such as may occur during a cleaning cycle or flushing cycle. A non-periodic disturbance may also be caused by a power supply surge, a faulty transmitter or poor grounding.

P6 indicates externally triggered periodic variability of MV caused by oscillations coming from load changes.

P7 is a catch-all category for situations where something is wrong with the process, but the situation does not fit into any of the other process (P) categories. P7 is only manually (visually) determined.

Figure 22:
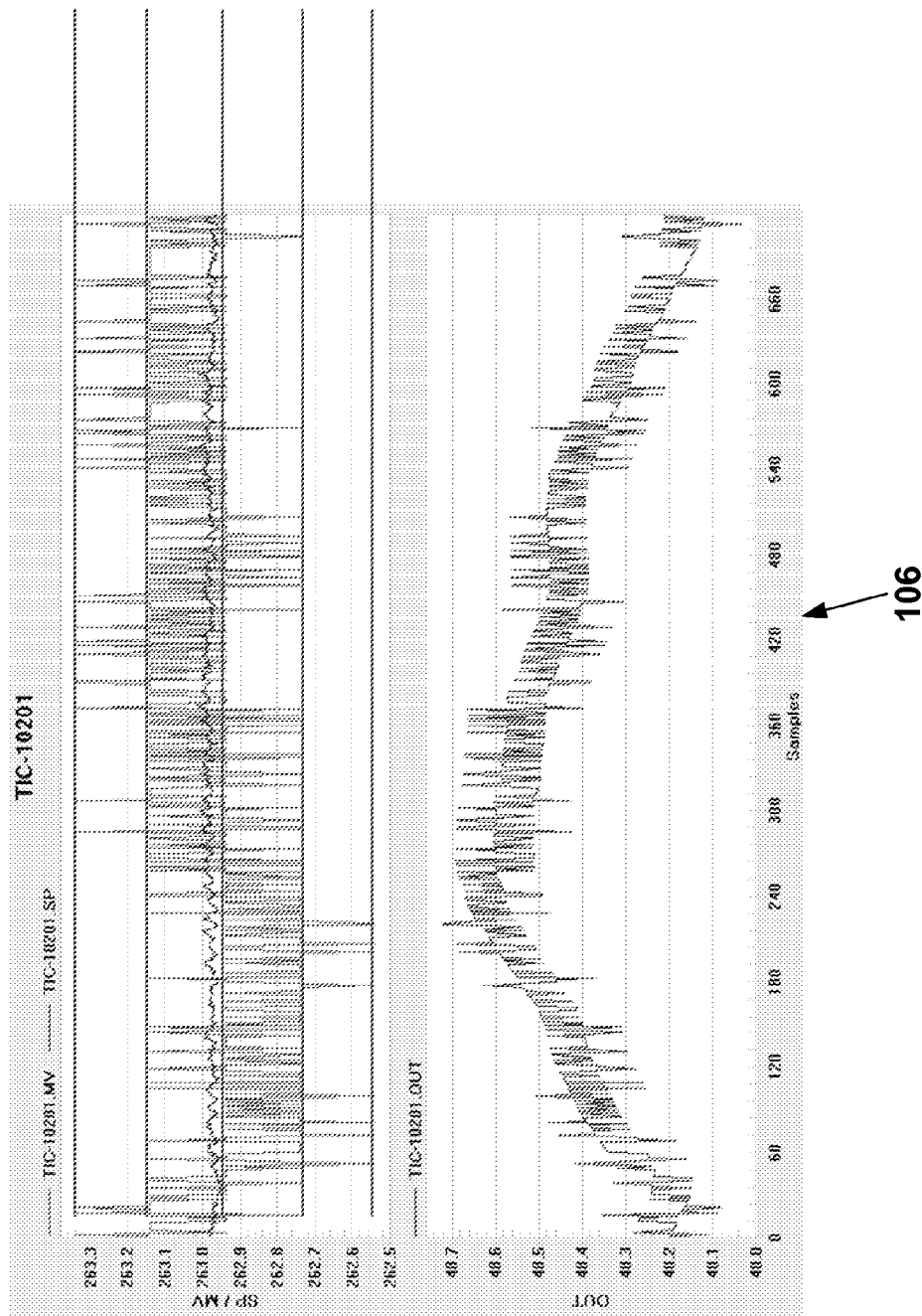
FIG. 22 shows a portion of a display in the GUI having a controller data grouping view for a controller having quantization.

S1 indicates data sets where the MV is strongly quantized. Quantization is usually related to poor A/D converters, or A/D converters that do not have enough resolution. The main issue is the impact on the FCE. Quantization is similar to, but not the same as a deadband on the MV. Although quantization causes clear bands in the MV, these bands do not move like a deadband on the MV. A portion of a display 184 of a controller data grouping view, showing quantization is shown in FIG. 22. As shown, there are clear bands in the MV. A difference trend and a histogram are good tools to further visualize this problem.

S2 provides an indication of excessive noise in the MV.

S3 indicates that a data set is corrupted by either singular outliers or spikes or multiple subsequent outliers. The spikes can be in the MV and/or the Out. Spikes can be caused by short temporary losses of signal (e.g. a power glitch, etc.), air pockets in a magnetic flow meter, conductive material in a magnetic flow meter, electrical contact problems, loose connections and electrical spikes on signals.

S4 indicates calibration steps or unnatural step-wise disturbances, which the controller may try to control. A trend indicative of this condition is a step-change in the MV that is faster than what could possibly occur with the "normal" dynamics of the process. This condition is bad because the controller may try to correct the (phantom) step-change, which can cause a real problem.

S5 indicates data that has been compressed by some database compression method. Often plant historians are configured to compress data if MV does not change by a specified amount. Often when compressed data is reconstructed, interpolation of the points results in non-smooth trends. Compressed data and/or data reconstructed therefrom should not be used for control.

S6 indicates that a strong first order filter has been added to the MV, which causes its signal to be very smooth, i.e., too smooth. The filter may be in the transmitter, the signal line, in analog input circuitry or in the controller. Filters that are too large can cause levels to go unstable and disturbances to show up much later in the MV than when they actually occur.

Figure 23:
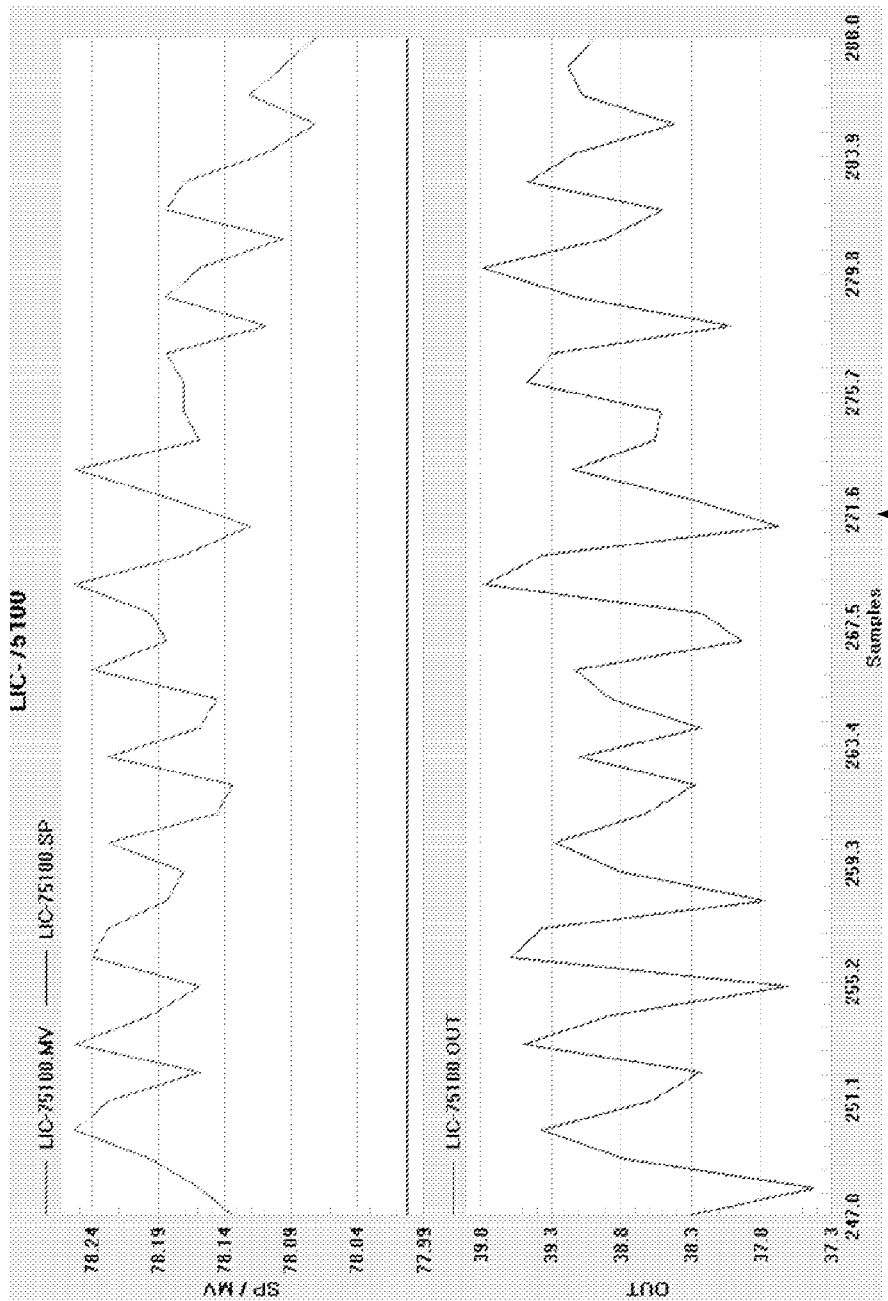
FIG. 23 shows a portion of a display in the GUI having a controller data grouping view, showing an insufficient data collection sampling rate for a controller.

S7 indicates whether the data collection sampling rate is appropriate (i.e. fast enough) for analysis and control. Often the sample rate of the analog input circuitry is slower than the PID sample rate, which results in a limit cycle where there are multiple corrections for the same error. A trend indicative of this condition is an MV trend which should be changing every sample, but instead has a large number of flat spots (zero order hold). An insufficient data collection sampling rate often occurs with auto tuners, which when allowed to calculate a sample rate, often select large sample times. A portion of a display 186 of a controller data grouping view, showing an insufficient data collection sampling rate is shown in FIG. 23. As shown, there are a significant number of flat spots. S7 is only manually (visually) determined.

S8 indicates that there is no signal as evidenced by a constant MV. The cause of no signal may be a broken signal line, a broken transmitter or the OPC server 84 may be incorrectly configured.

S9 indicates an MV in saturation (in open or closed-loop) as evidenced by the MV going above or below the controller high and low set point limits.

S10 is a catch-all category for situations where something is wrong with the signal, but the situation does not fit into any of the other signal (S) categories. S10 is only manually (visually) determined.

As set forth above, many of the assessments of the major KPIs can be automatically generated. This automatic generation is performed by a mathematical engine 190 and a rules engine 192 of the loop analysis program 94 (see FIG. 24). The mathematical engine 190 takes all the data arrays for the controllers (SP, MV, Out), which were acquired by the data acquisition program 92 and stored in the database 90, and applies mathematical formulations (mean, standard, deviation, skew etc) thereto. These mathematical formulations are performed by stored software routines that are executed by the mathematical engine 190. The mathematical engine 190 also executes the LPM software routines on the data arrays. The results of the calculations performed by the mathematical engine 190 are placed in a matrix or numerical surface 194, which is then acted upon by the rules engine 192 to generate the assessments of the major KPIs. The rules engine 192 executes stored software algorithms that look for predetermined relationships between the results of the numerical methods, the LPM data and the LPM results. The assessment of a major KPI is indicated in a KPI box 198, which is displayed in the second selection window 110. As best shown in FIG. 25, the KPI box 198 includes a list of all of the major KPIs. On opposing sides of each major KPI, there is located a check box and a severity box for indicating the state and value of the major KPI, respectively. A check in a check box indicates that there is a problem in the associated major KPI. The severity of the problem (on a scale of 0-100%, with 100% being the most severe) is displayed in the corresponding severity box.

Figure 24:
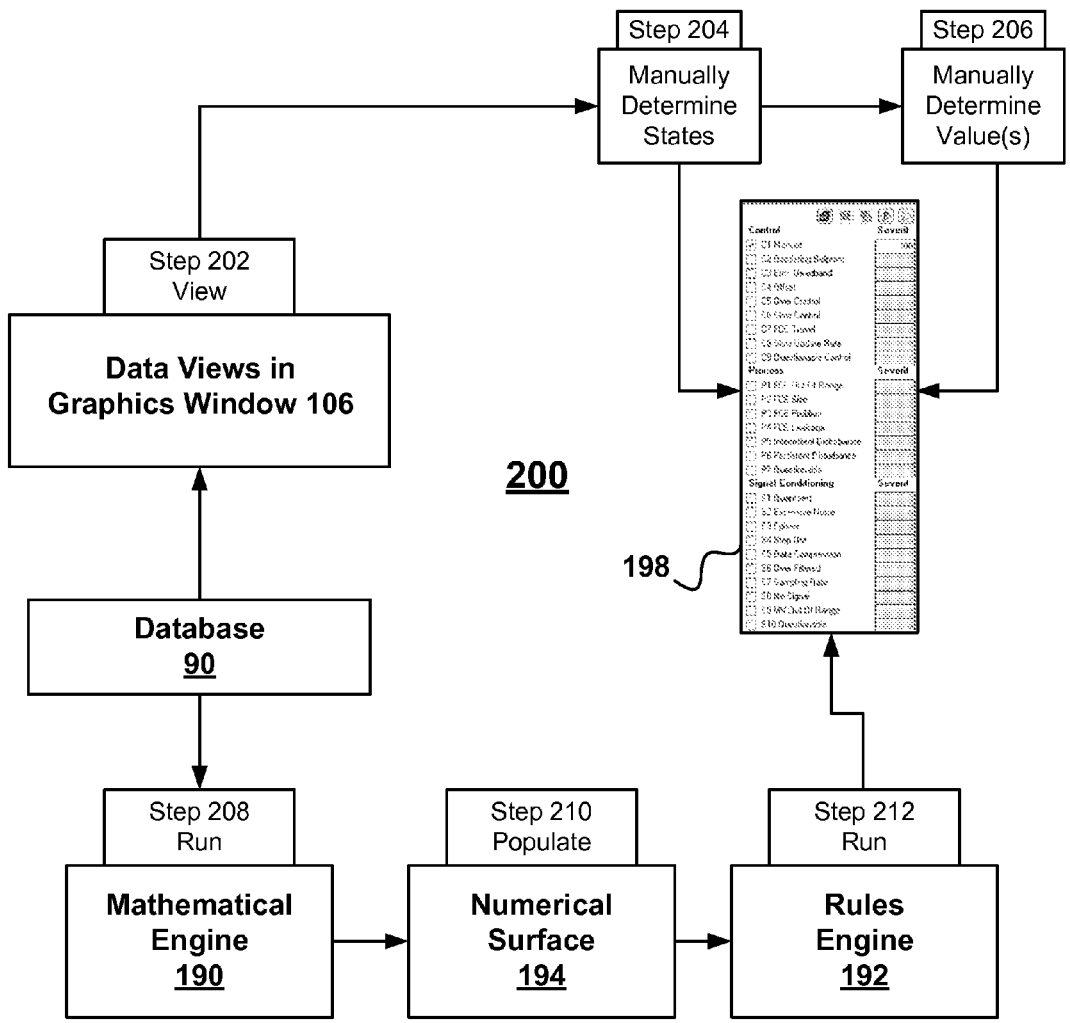
FIG. 24 is a schematic flow chart showing how the loop analysis program can be used to analyze a control loop manually, automatically and in a combined manner.
Figure 25:
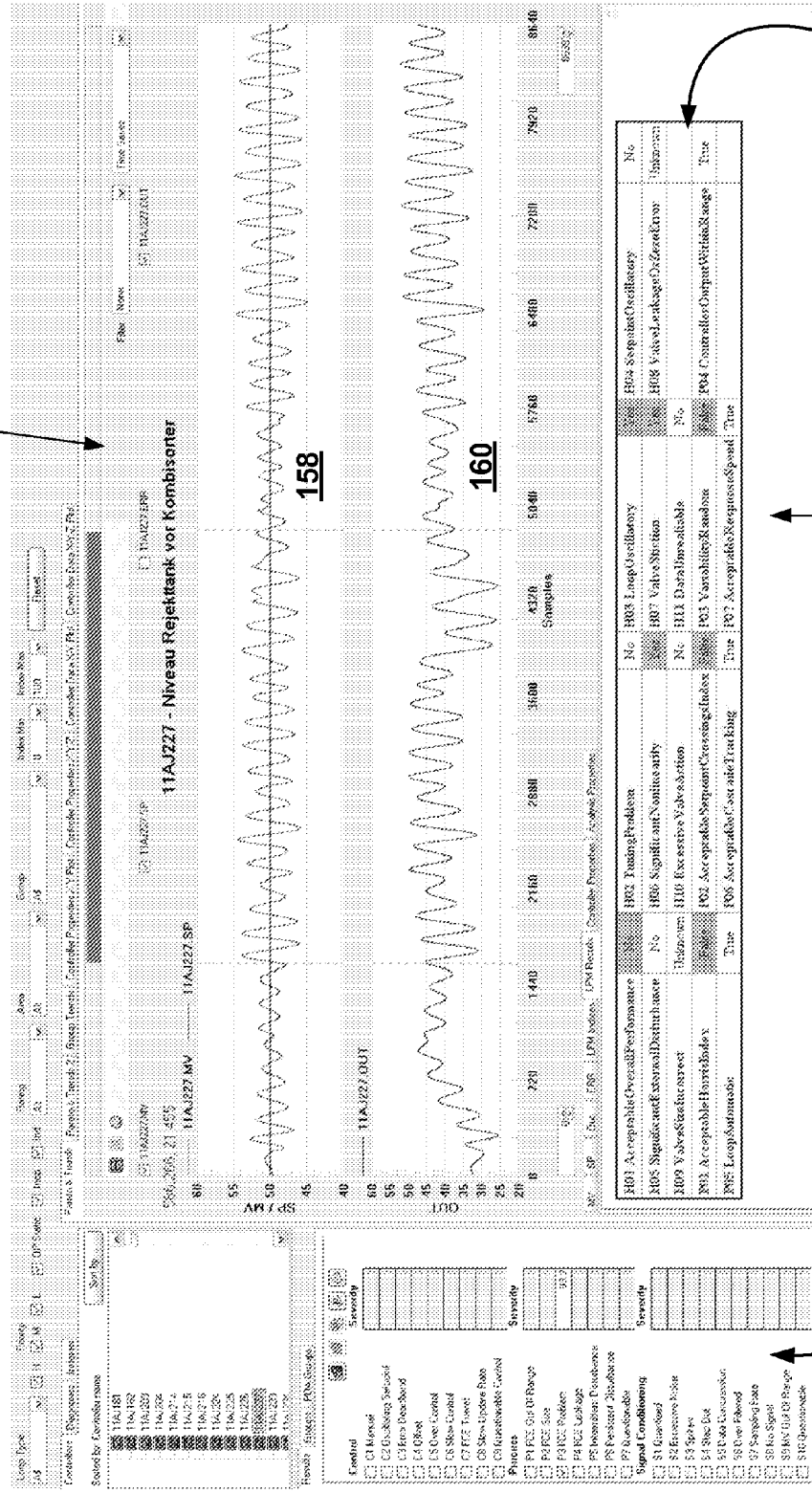
FIG. 25 shows a portion of a display in the GUI having a combined process and numerical view and a KPI box.

Referring now to FIG. 24, there is shown a schematic flow chart 200 showing how the loop analysis program 94 can be used to analyze a control loop (controller) manually, automatically and in a combined or hybrid manner. The manual process begins with step 202 in which a user views one or more data views (such as a control data grouping view) in order to generate assessments of the major KPIs. In step 204, the user determines the states of the major KPIs, i.e., whether there are any problems, and, if so, places a check in the check box(es) for the major KPI(s) having a problem in the KPI box 198. In step 206, the user determines the value (severity) of any major KPI having a problem and enters the severity in the severity box for the major KPI in the KPI box 198. Thus, the manual process begins with step 202 and proceeds to step 204 and then step 206.

The automatic process begins with the mathematical engine 190 executing the stored software routine in step 208 to perform the mathematical formulations on the data arrays stored in the database 90. In step 210, the numerical surface 194 is populated with the results of the mathematical formulations. In step 212, the rules engine 132 acts on the numerical surface 194 to generate assessments of the major KPIs and enters them into the KPI box 198. Thus, the automatic process begins with step 208 and proceeds to step 210 and then step 212.

Once the automatic process is complete, a user may review the data to confirm or reject all or part of the results of the automatic process. For example, if the automatic process determines that there is a problem in a particular major KPI, the user may view one or more data views in order to discern if there really is a problem in the particular major KPI (i.e., the diagnosis of a problem is correct). For example, the user may view the trends in trend boxes 158, 160 and the data in the numerical methods table 162 of a combined process and numerical view, such as is shown in FIG. 22. The data in the numerical methods table 162 may be the portion of the numerical surface 194 (LPM results) relating to the control loop. If the user does not visually detect a problem or the user believes that a different problem is present (i.e., a problem in another major KPI), the user may override the assessment of the major KPI generated by the automatic process and manually enter information the user believes to be correct. It should be appreciated that in the scenario described above, a hybrid KPI generation method has been performed. The automatic process steps of 208-210-212 have been performed and then the manual process steps of 202-204-206 have been performed.

In addition to, or as a part of, verifying the results of the automatic process, a user should view and analyze one or more data views to determine whether there are any problems in the major KPIs that can only be assessed manually (visually), such as C3, C8, C9, P7, S6, S7 and S10.

Referring now to FIG. 25, there is shown a portion of a display 220 for a controller 11AJ227, which is operable to control a valve. The display 220 includes a combined process and numerical view and a KPI box 198. As shown, the KPI box 198 is displayed in the second selection window 110, while the combined process and numerical view is shown in the graphics window 106. This combined process and numerical view is similar to that shown in FIG. 13, except the "LPM Results" tab has been selected, which causes the portion of the numerical surface 194 relating to the controller 11AJ227 to populate the numerical methods table 162. SP/MV and Out trends are shown in the trend boxes 158, 160, respectively. The assessments of the major KPIs have been automatically generated and, as shown, only the state of one major KPI indicates a problem, namely P3: FCE Problem. The problem is indicated by a check in the check box next to P3. This problem is confirmed by the LPM results set forth in the numerical methods table 162 as well as the clear oscillatory behavior shown in the SP/MV and Out trends in the trend boxes 158, 160. As set forth above with regard to the LPM results, H01 indicates that overall performance is not acceptable; H03 indicates that the control loop is oscillatory; H06 indicates significant non-linearity; H07 indicates valve stiction; P01 indicates that the Harris Index is not acceptable; P02 indicates that the SP crossing index is not acceptable; and P03 indicates that the variability is not random.

The analysis of a control loop (controller) described above can be done control loop by control loop for all of the control loops in the DCS 20. Although the features of the loop analysis program 94 described above permit this to be performed rather quickly, the process still takes significant time. Another feature of the loop analysis program 94 is that it provides logical groupings of the assessments of the major KPIs for all of the control loops of the DCS 20, which provides rapid overviews of all control loops. These groupings are arranged in a hierarchical structure and may be viewed in the graphics window 106 by clicking on tab 224. In a top or first level, the total number of control loops (controllers) having an issue (problem) is determined and displayed. In addition, for each control loop area (i.e., process, control and signal conditioning), the total number of control loops having an issue in the control group area is determined, displayed and graphically illustrated with a bar. In the next or second level, for each major KPI in a selected control group area, the total number of control loops having an issue in the major KPI is determined, displayed and graphically illustrated with a bar. In a third level, for a selected major KPI of the selected control group area, the controllers having an issue in the major KPI are individually listed and a severity of the issue for each controller is determined, displayed and graphically illustrated with a bar.

Figure 26:
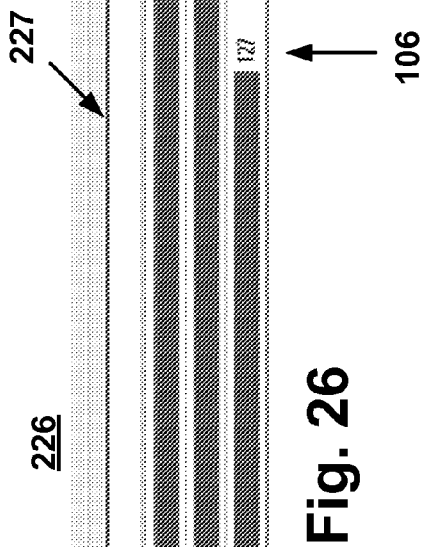
FIG. 26 shows a portion of a display in the GUI having a first level KPI grouping.
Figure 27:
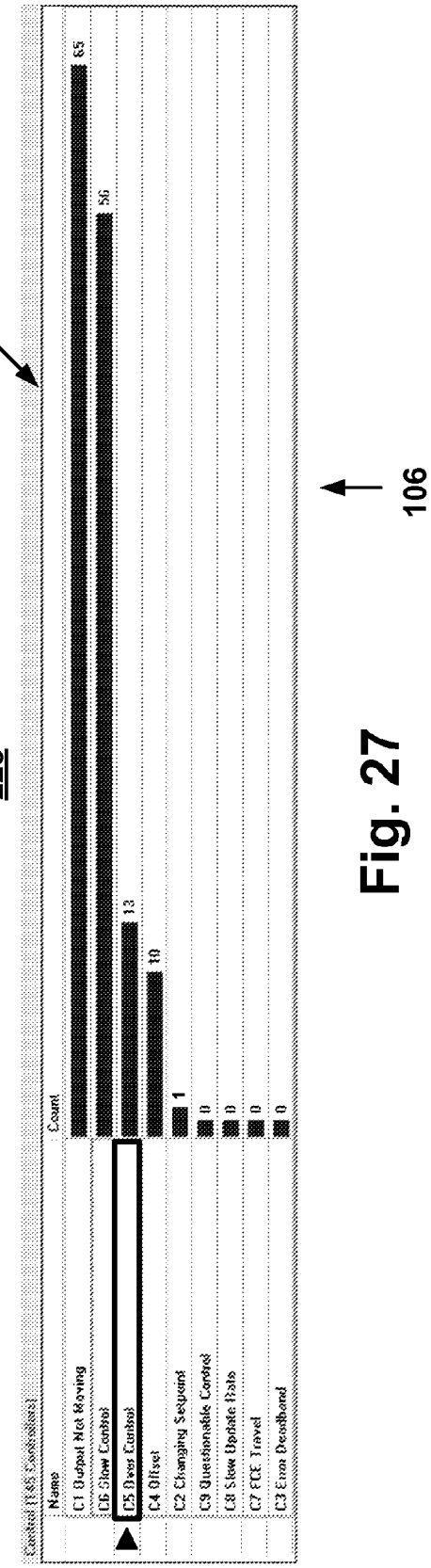
FIG. 27 shows a portion of a display in the GUI having a second level KPI grouping.
Figure 28:
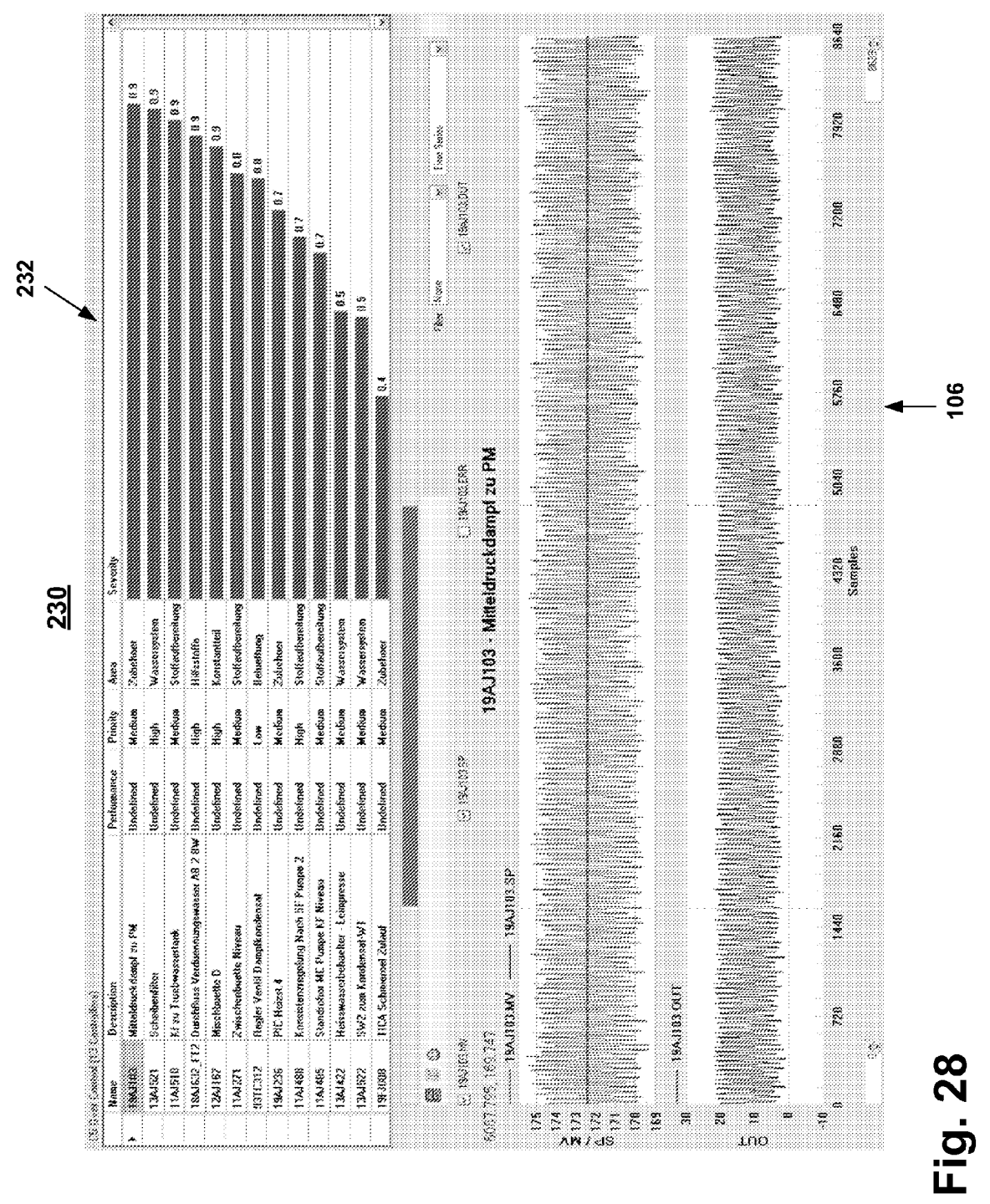

FIG. 26 shows a portion of a display 226 showing a first level KPI grouping. The total number of control loops (controllers) having an issue (339) is displayed in the top left. Below this total is a bar chart 227 showing the total number of control loops with an issue in the process area (209), the total number of control loops with an issue in the control area (145) and the total number of control loops with an issue in the signal conditioning area (127). Clicking on the control area causes a second level KPI grouping to be displayed, which is the major KPIs in the control area, as is shown in FIG. 27. In this display (designated by the reference numeral 228), the total number of control loops (controllers) having an issue in the control area (145) is displayed in the top left. Below this total is a bar chart 229 showing the total number of control loops having problems in the different major KPIs in the control area (C1-C7). The bar chart 229 shows that 65 controllers have an issue in C1 (static output), 56 controllers have an issue in C6 (slow-control), 13 controllers have an issue in C5 (over-control), 10 controllers have an issue in C4 (offset) and 3 controllers have an issue in C2 (changing set point). As shown, the bars (for the different major KPIs) are arranged in the order of the major KPIs have the greatest number of controllers experiencing an issue, from the greatest to the least. Clicking on C5 (over-control) causes a third level of KPI groupings to be displayed, which is the control loops (controllers) having over-control issues, as shown in FIG. 28. In this display (designated by the reference numeral 230), the total number of controllers having an over-control issue (13) is displayed in the top left. Below this total is a bar chart 232 showing the controllers and the severities of their over-control issues, respectively. Clicking on one of the listed controllers (e.g. 19AJ103) causes trends for the controller to be displayed under the bar chart 232, as shown.

The loop analysis program 94 permits a user to sort the major KPIs based on one or more of the following: (1.) Loop type: flow, pressure, level, consistency, etc.; (2.) Priority: high, medium and low; (3.) Exclude Loops that are in manual or are indicators; (4.) Overall Performance Rating; (5.) Process Areas; (6.) Controller Groupings; and (6.) User-Specified Statistical Results. Default sorting is done based on a normalized variability in the control error. A user invokes sorting operations of the major KPIs through a filter tool bar in the graphics window 106.

Figures 29, 30, 31:
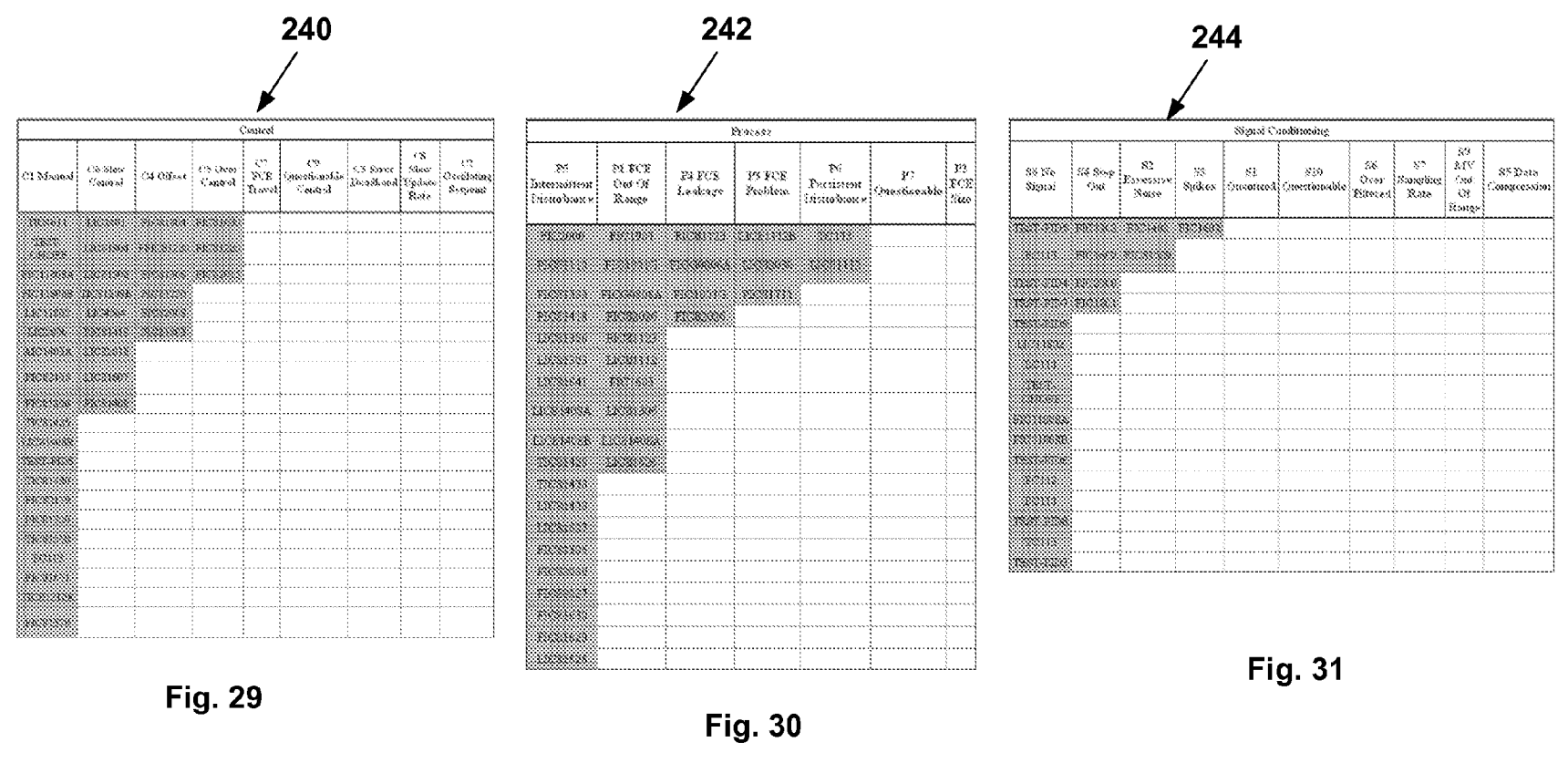

Printed reports for the major KPIs may be produced by the loop analysis program 94. Such reports can be used to target solutions for the worst performing control loops. The loop analysis program 94 permits great flexibility in the types of reports that may be generated. FIGS. 29-31 show three reports 240, 242, 244, respectively, that may be generated. The reports 240-242 are for major KPIs that have been filtered to show only high priority controllers. Each of the reports 240-244 is in the form of a table with the controllers arranged in rows and the major KPIs arranged in columns. The report 240 shows the controllers that have issues (problems) in the major KPIs (C1-C9) in the control area, the report 242 shows the controllers that have issues (problems) in the major KPIs (P1-P7) in the process area and the report 244 shows the controllers that have issues (problems) in the major KPIs (S1-S10) in the signal conditioning area. It should be appreciated that reports can be generated that are the same as the reports 240-244, except the reports show all of the controllers with issues (not just those that are designated as being high priority controllers). In these reports, the controllers may be color-coded to show their priority (high, medium, low).

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method performed by a computer for analyzing one or more of a plurality of control loops of a control system operable to control a process, the control loops each having a controller, a final control element and a measurement device for providing the controller with a measurement of a process variable being controlled by the controller, the method comprising:
receiving, from a user, a selection of one of the control loops for analysis;
generating an assessment for a pre-defined key performance indicator (KPI) for each of first, second and third sections of the selected control loop, the first section relating to the controller of the selected control loop, the second section relating to the process and the final control element of the selected control loop and the third section relating to the measurement of the process variable of the selected control loop;
displaying, in a single screen of a graphical user interface (GUI) of the computer, at least two different types of control data of the selected control loop, the types of control data being selected from the group consisting of the measurement of the process variable, output of the controller, set point of the controller, proportional tuning parameter of the controller, integral tuning parameter of the controller and error, which is the difference between the set point of the controller and the measurement of the process variable;
displaying, in the single screen of the GUI of the computer, the generated assessments of the pre-defined KPIs for the selected control loop;
receiving, from a user, a different assessment for one of the KPIs for the selected control loop; and
displaying, in the single screen of the GUI of the computer, the received different assessment of the one of the pre-defined KPIs for the selected control loop in lieu of the generated assessment for the one of the pre-defined KPIs for the selected control loop.

2. The method of claim 1, wherein the control data is displayed in the form of time series trends.

3. The method of claim 2, wherein a first one of the time series trends is for the set point of the controller and a second one of the time series trends is for the output of the controller.

4. The method of claim 2, wherein a third one of the time series trends is for the measurement of the process variable.

5. The method of claim 1, wherein each of the assessments of the pre-defined KPIs comprises a state indicating a problem or no problem.

6. The method of claim 5, wherein the assessment of each pre-defined KPI having a state indicating a problem further comprises a value indicating a severity of the problem.

7. The method of claim 5, wherein the pre-defined KPI for the first section is selected from the group consisting of over-control, under control, excessive manual control, oscillatory set point, significant deadband in the controller, non-zero control error, excessive movement of the final control element, slow execution of the controller and unknown control problem.

8. The method of claim 7, wherein the pre-defined KPI for the second section is selected from the group consisting of saturated output of the controller, operation of the final control element mostly in outer portions of its operating range, cyclic behavior of the measurement of the process variable and the output of the controller, a calibration error in the measurement device or a leakage in the final control element, a non-periodic disturbance in the process, externally triggered periodic variability in the measurement of the process variable and unknown process problem.

9. The method of claim 8, wherein the pre-defined KPI for the third section is selected from the group consisting of the measurement of the process variable being quantized, excessive noise in the measurement of the process variable, outliers in the measurement of the process variable and/or output of the controller, unnatural step changes in the measurement of the process variable, data compression, over-smoothness of the measurement of the process variable, inappropriate sampling rate for the measurement of the process variable, no measurement of the process variable, saturation in the measurement of the process variable and unknown measurement problem.

10. The method of claim 1, comprising generating assessments for a plurality of KPIs for each of first, second and third sections of the selected control loop.

11. The method of claim 1, wherein the control data is displayed in the form of a two dimensional plot of two different data types against each other.

12. The method of claim 11, wherein a first one of the data types is the measurement of the process variable and a second one of the data types is the output of the controller.

13. The method of claim 1, wherein the control data is displayed in the form of a three dimensional plot of three different data types against each other.

14. The method of claim 13, wherein a first one of the data types is the measurement of the process variable, a second one of the data types is the output of the controller and a third one of the data types is the set point of the controller.

15. The method of claim 1, further comprising performing numerical methods on one of the types of control data and displaying the results thereof in a table in the single screen of the GUI of the computer, the numerical methods comprising standard deviation, mean, average, maximum and minimum.

* * * * *